United States Patent
Yoshida et al.

(10) Patent No.: US 12,355,925 B2
(45) Date of Patent: Jul. 8, 2025

(54) DIGITAL CAMERA WITH PRINTER

(71) Applicant: FUJIFILM Corporation, Tokyo (JP)

(72) Inventors: Masako Yoshida, Saitama (JP);
Masayuki Sakai, Saitama (JP);
Akimasa Kaya, Saitama (JP); Shinichi Fujimoto, Saitama (JP); Yasushi Tanaka, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/630,848

(22) Filed: Apr. 9, 2024

(65) Prior Publication Data

US 2024/0259506 A1 Aug. 1, 2024

Related U.S. Application Data

(63) Continuation of application No. 17/931,841, filed on Sep. 13, 2022, now Pat. No. 11,985,275.

(30) Foreign Application Priority Data

Sep. 30, 2021 (JP) .................................. 2021-161961

(51) Int. Cl.
*H04N 1/00* (2006.01)
*H04N 23/63* (2023.01)
*H04N 23/667* (2023.01)

(52) U.S. Cl.
CPC ....... *H04N 1/00286* (2013.01); *H04N 23/632* (2023.01); *H04N 23/667* (2023.01)

(58) Field of Classification Search
CPC combination set(s) only.
See application file for complete search history.

(56) References Cited

U.S. PATENT DOCUMENTS

2001/0009436 A1 7/2001 Sasaki
2013/0182168 A1 7/2013 Otani
(Continued)

FOREIGN PATENT DOCUMENTS

EP 3336768 A1 6/2018
JP 2001-061087 A 3/2001
(Continued)

OTHER PUBLICATIONS

"Notice of Reasons for Refusal" Office Action issued in JP 2021-161961; mailed by the Japanese Patent Office on Jan. 27, 2025.
(Continued)

*Primary Examiner* — Xi Wang
(74) *Attorney, Agent, or Firm* — Studebaker Brackett PLLC

(57) ABSTRACT

Provided is a digital camera with a printer having good operability.

A digital camera with a printer includes an imaging unit, a print unit that prints an image on a medium and discharges the printed medium, a display unit, a first operation member that is rotated from a first position in a first direction around a rotation axis against biasing force, and is rotated in a second direction opposite to the first direction by the biasing force to be returned to the first position in a case in which the first operation member is released, and a processor. The processor performs specific control in accordance with operation of the first operation member.

17 Claims, 22 Drawing Sheets

(56) References Cited

U.S. PATENT DOCUMENTS

| | | |
|---|---|---|
| 2014/0063316 A1 | 3/2014 | Lee et al. |
| 2018/0176397 A1* | 6/2018 | Nishiura ............ H04N 23/667 |
| 2018/0176433 A1 | 6/2018 | Nishiura et al. |
| 2021/0409553 A1 | 12/2021 | Nagai et al. |

FOREIGN PATENT DOCUMENTS

| | | |
|---|---|---|
| JP | 2001-199125 A | 7/2001 |
| JP | 2007-318536 A | 12/2007 |
| JP | 2008-283348 A | 11/2008 |
| JP | 2012-231362 A | 11/2012 |
| JP | 2015-038571 A | 2/2015 |
| JP | 2015-106820 A | 6/2015 |
| JP | 2017-201599 A | 11/2017 |
| JP | 2018-094841 A | 6/2018 |
| WO | 2010/122644 A1 | 10/2010 |
| WO | 2020/195637 A1 | 10/2020 |

OTHER PUBLICATIONS

The extended European search report issued by the European Patent Office on Dec. 22, 2022, which corresponds to European Patent Application No. 22195722.8-1224 and is related to U.S. Appl. No. 17/931,841.

An Office Action; "Notice of Reasons for Refusal," mailed by the Japanese Patent Office on May 16, 2025, which corresponds to Japanese Patent Application No. 2021-161961 and is related to U.S. Appl. No. 18/630,848; with English language translation.

* cited by examiner

FIG. 23A 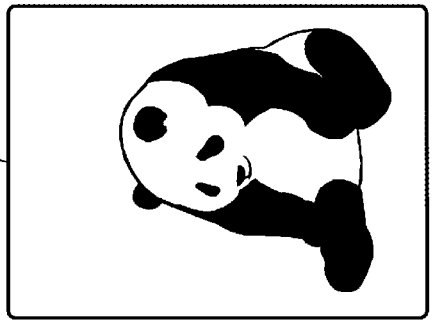 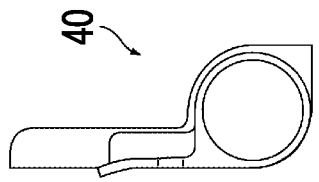
FIG. 23B 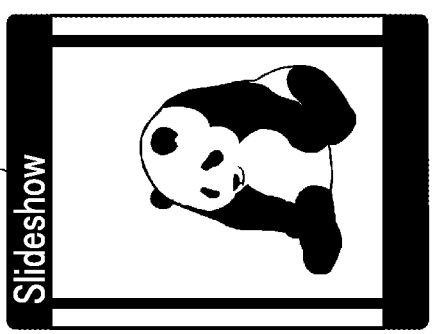 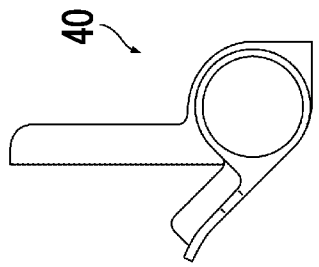
FIG. 23C 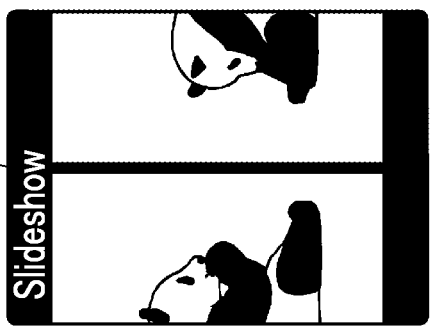 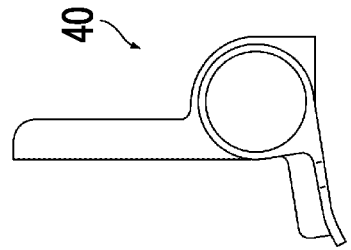
FIG. 23D 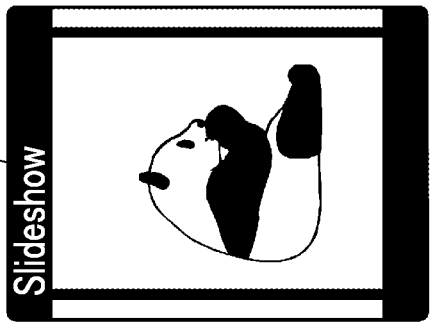 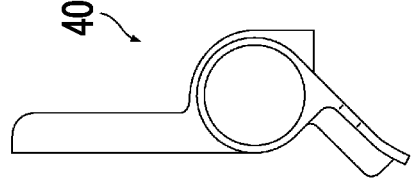
FIG. 23E 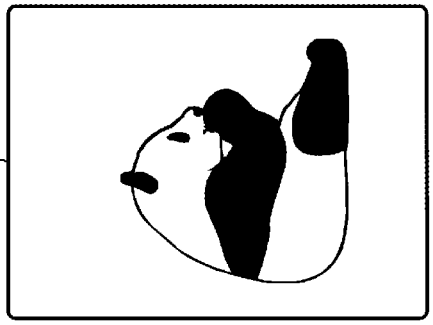 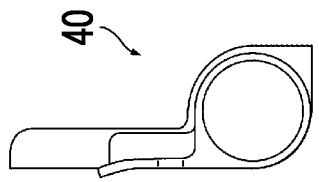

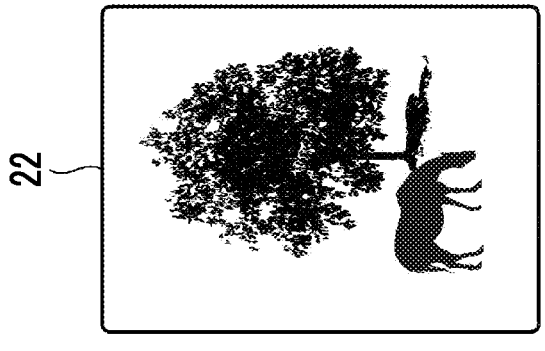
FIG. 24A
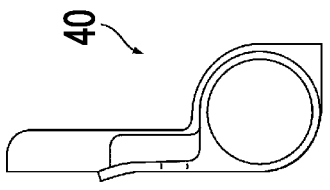
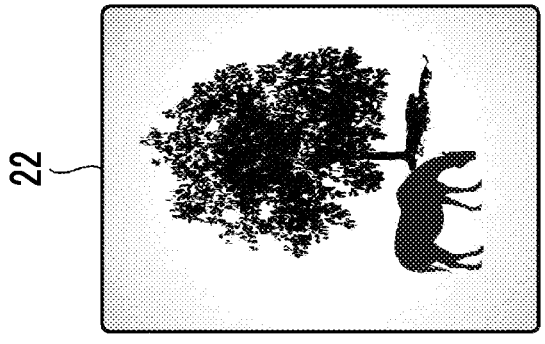
FIG. 24B
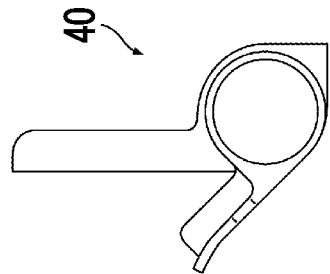
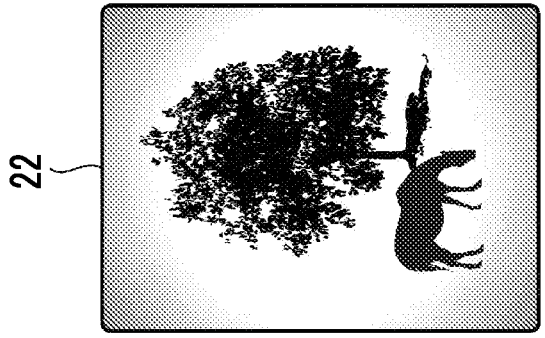
FIG. 24C
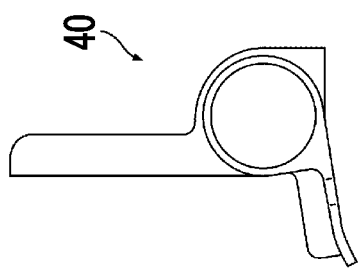
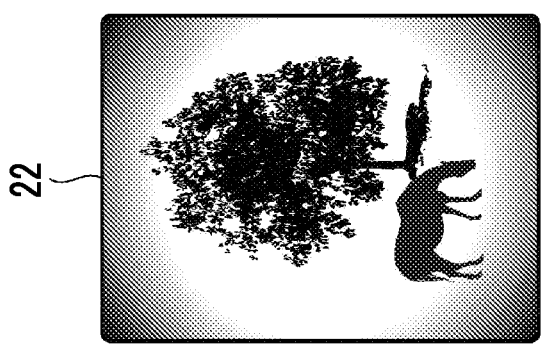
FIG. 24D
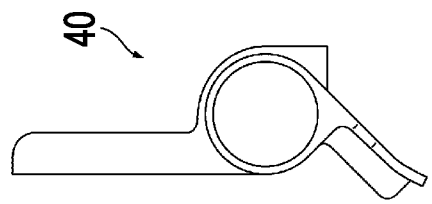

DIGITAL CAMERA WITH PRINTER

CROSS-REFERENCE TO RELATED APPLICATION

The present application is a Continuation of U.S. patent application Ser. No. 17/931,841 filed on Sep. 13, 2022, which claims priority under 35 U.S.C. § 119(a) to Japanese Patent Application No. 2021-161961 filed on Sep. 30, 2021, which is hereby expressly incorporated by reference, in its entirety, into the present application.

BACKGROUND OF THE INVENTION

1. Field of the Invention

The present invention relates to a digital camera with a printer.

2. Description of the Related Art

JP2018-94841A discloses a digital camera (digital camera with a printer) having a printer built in a camera body.

JP2007-318536A discloses the technology in which a rotatable lever is provided on an upper surface of a camera body, and images are classified into predetermined folders and recorded by rotating the lever.

SUMMARY OF THE INVENTION

One embodiment according to the technology of the present disclosure provides a digital camera with a printer having good operability.

(1) A digital camera with a printer, the digital camera comprising an imaging unit, a print unit that prints an image on a medium and discharges the printed medium, a display unit, a first operation member that is rotated from a first position in a first direction around a rotation axis against biasing force, and is rotated in a second direction opposite to the first direction by the biasing force to be returned to the first position in a case in which the first operation member is released, and a processor, in which the processor performs specific control in accordance with operation of the first operation member.

(2) The digital camera with a printer according to (1), in which, in accordance with a first operation of the first operation member, the processor performs control of generating an image picture in a case in which an image being displayed on the display unit is printed on the medium, and displaying the generated image picture on the display unit instead of the image being displayed on the display unit.

(3) The digital camera with a printer according to (2), in which the processor performs control of generating an animation switched continuously or stepwise from the image being displayed on the display unit to the image picture, and displaying the generated animation on the display unit.

(4) The digital camera with a printer according to (2) or (3), in which the processor performs control of moving the image picture being displayed on the display unit along a discharge direction of the medium in a case in which print is executed.

(5) The digital camera with a printer according to any one of (1) to (4), in which the processor performs control of setting the image being displayed on the display unit as a print target image in accordance with a first operation of the first operation member, and causing the print unit to print the print target image in accordance with a second operation of the first operation member.

(6) The digital camera with a printer according to (5), in which the first operation is an operation of rotating the first operation member to a second position, and the second operation is an operation of releasing the first operation member which has been rotated to the second position.

(7) The digital camera with a printer according to (5) or (6), in which the processor starts control of causing the print unit to print the image being displayed on the display unit after a time T has elapsed after the second operation of the first operation member.

(8) The digital camera with a printer according to (7), in which the processor receives an instruction to cancel print until the time T elapses after the second operation of the first operation member.

(9) The digital camera with a printer according to (8), further comprising a second operation member that is pressed, in which the processor receives the instruction to cancel the print in accordance with an operation of the second operation member.

(10) The digital camera with a printer according to (8), in which the processor receives the instruction to cancel the print in accordance with a third operation of the first operation member.

(11) The digital camera with a printer according to any one (1) to (10), in which the print unit discharges the printed medium in a predetermined direction along a display surface of the display unit, and in the first operation member, the rotation axis is disposed orthogonal to a discharge direction of the medium, and the second direction is set to the same direction as the discharge direction of the medium.

(12) The digital camera with a printer according to any one of (1) to (11), further comprising a third operation member that is rotated, and a fourth operation member that is rotated, in which the processor performs control of switching a type of first image processing performed on an image being displayed on the display unit in accordance with an operation of the third operation member, and performs control of switching a type of second image processing performed on the image being displayed on the display unit in accordance with an operation of the fourth operation member.

(13) The digital camera with a printer according to (12), in which the image being displayed on the display unit is a live view image captured by the imaging unit.

(14) The digital camera with a printer according to (1), in which the processor starts control of displaying captured images on the display unit in a sequentially switching manner in accordance with an operation of rotating the first operation member to a second position, and terminates control of displaying the captured images on the display unit in a sequentially switching manner in accordance with an operation of returning the first operation member to the first position.

(15) The digital camera with a printer according to (14), in which the processor further performs control of changing a speed of switching the images in accordance with a rotation angle of the first operation member.

(16) The digital camera with a printer according to (1), in which the processor performs control of changing intensity of image processing performed on an image being displayed on the display unit in accordance with a rotation angle of the first operation member.

BRIEF DESCRIPTION OF THE DRAWINGS

FIGS. 23A to 23E are diagrams showing relationships between the operation of the operation lever and switching of the displaying of the display.
FIGS. 24A to 24D are diagrams showing examples of a relationship between the operation of the operation lever and the intensity of the image processing.

DESCRIPTION OF THE PREFERRED EMBODIMENTS

In the following, preferred embodiments of the present invention will be described in detail with reference to the accompanying drawings.

Here, a case in which the present invention is applied to a digital camera with a printer that prints an image using an instant film will be described as an example.

Appearance Configuration of Digital Camera with Printer

FIGS. 1 to 6 are a front view, a rear view, a right side view, a left side view, a plan view, and a bottom view of the digital camera with the printer, respectively.

As shown in FIGS. 1 to 6, a digital camera 1 with the printer has a vertically long and flat rectangular parallelepiped camera body 10. The camera body 10 has a portable size that can be grasped with one hand.

Figure 1:
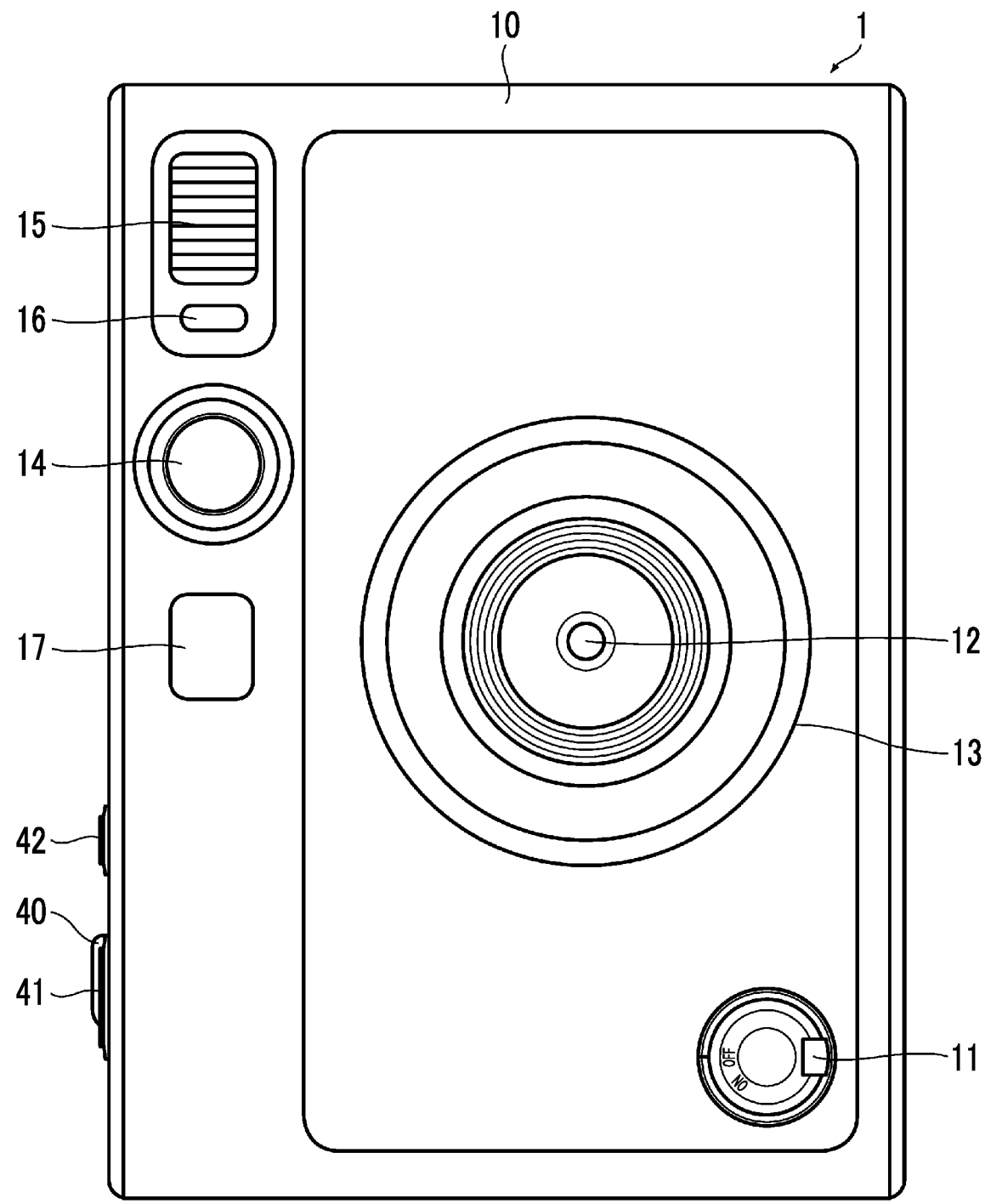
FIG. 1 is a front view of a digital camera with a printer.

As shown in FIG. 1, a power lever 11, a lens 12, an operation ring 13, a first shutter button 14, a strobe 15, a self-timer lamp 16, a selfie mirror 17, and the like are provided on a front surface of the camera body 10.

The power lever 11 is an operation member that turns on and off the power of the digital camera 1 with the printer. The power lever 11 is rotated between an ON position and an OFF position to turn on and off the power of the digital camera 1 with the printer.

The lens 12 is a lens for imaging. In the present embodiment, the lens 12 is composed of a single focus lens.

The operation ring 13 is an operation member that is rotated around an optical axis of the lens 12. The operation ring 13 comprises a so-called click mechanism. Therefore, click feeling is given to the operation. In addition, the click is stopped at regular angular intervals. A predetermined function is assigned to the operation ring 13 in accordance with a mode of the camera. For example, in the imaging mode, a function of selecting an effect to be applied to the image is assigned. In addition, for example, in a playback mode, functions of one frame advance and one frame return are assigned. It should be noted that the effect is processing of giving a certain effect to the image. For example, processing of changing or blurring a tone of the image corresponds to the effect.

The first shutter button 14 is configured by a two-stage push button that can be half-pushed and fully pushed. In the digital camera 1 with the printer, the preparation for the imaging is performed by half-pushing the first shutter button 14, and the imaging is executed by fully pushing the first shutter button 14. By preparing for the imaging, automatic exposure (AE), automatic focusing (AF), and the like are performed. The first shutter button 14 is mainly used for the imaging in a vertical position. The imaging in the vertical position means imaging in a direction in which a long side of the image to be captured is vertical (perpendicular). In the digital camera 1 with the printer according to the present embodiment, as shown in FIGS. 1 and 2, a normal usage form is the imaging in the vertical position.

The self-timer lamp 16 is a lamp that emits light during self-timer imaging to give a notification of a timing of the imaging. The self-timer lamp 16 is also used as an AF auxiliary light lamp. The AF auxiliary light is light that is emitted in a case of the AF to assist focusing.

The selfie mirror 17 is a mirror used in a case of capturing the image by himself/herself as a subject, and is used for confirming an imaging range.

Figure 2:
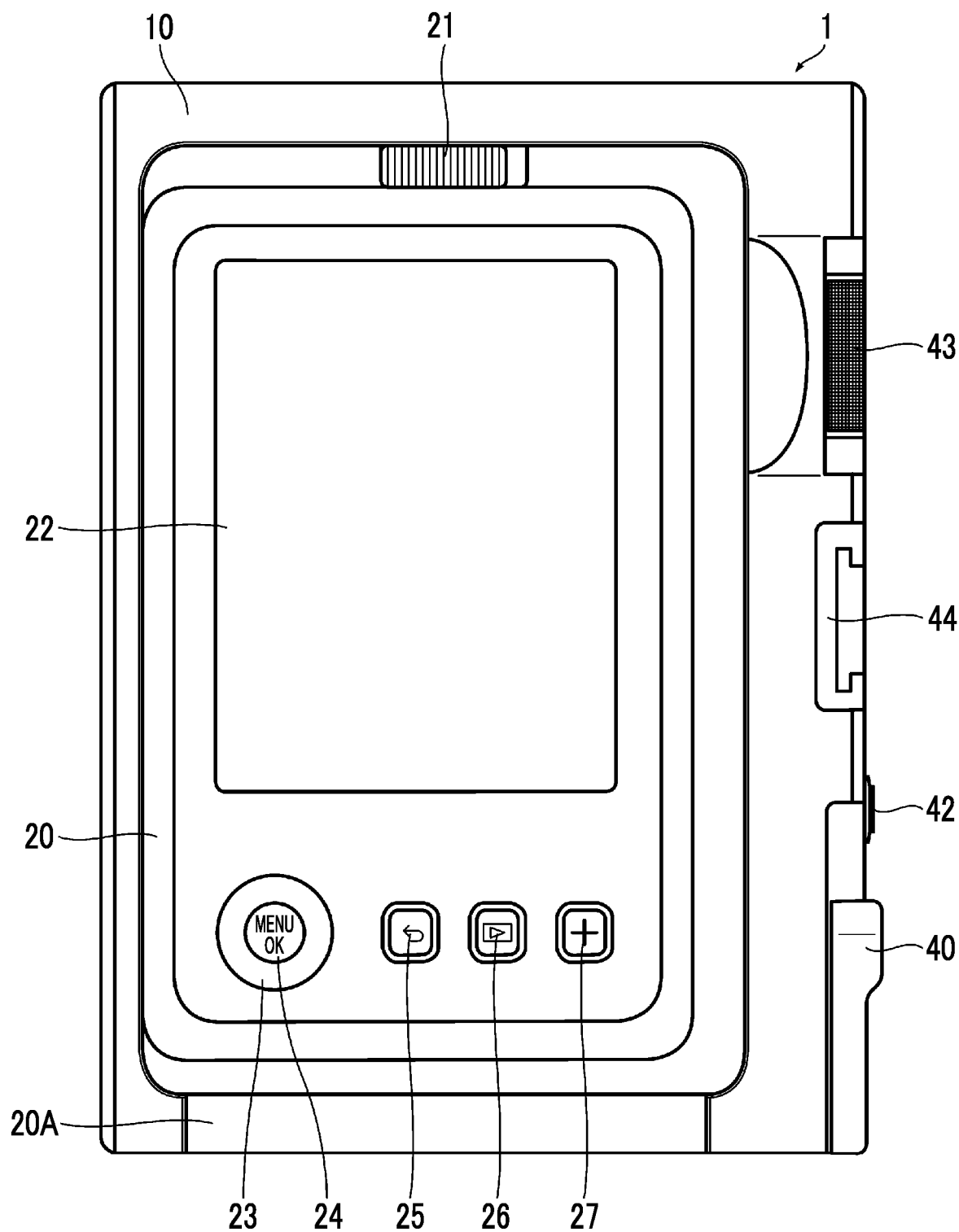
FIG. 2 is a rear view of the digital camera with the printer.

As shown in FIG. 2, a film door 20, a display 22, a cross key 23, a MENU/OK button 24, a return button 25, a playback button 26, a function button 27, and the like are provided on a rear surface of the camera body 10.

The film door 20 is a door member that opens and closes a film loading chamber provided on the camera body 10. The film door 20 is provided to be openable and closable via a hinge part 20A. The camera body 10 comprises a lock mechanism (not shown) that locks the film door 20. In a case in which the film door 20 is closed, the film door 20 is automatically locked by this lock mechanism. The lock is released by a slide type lock release lever 21 provided on the film door 20.

The display 22 is provided on the film door 20. The display 22 is used for displaying a live view and a captured image, and is also used for displaying a setting screen in a case of making various settings. The display 22 is an example of a display unit. The display 22 is configured by, for example, a liquid crystal display (LCD), and an organic electro luminescence diode display (organic EL display).

The cross key 23 is disposed coaxially with the MENU/OK button 24, and is pressed in four directions of up, down, left, and right with the MENU/OK button 24 as the center.

The MENU/OK button 24 is an operation member having both a function of the MENU button and a function of the OK button, and is configured by a push button. The function of the MENU button is a function of calling a MENU screen. The function of the OK button is a function of making an instruction to execute various confirmation items.

Each of the return button 25, the playback button 26, and the function button 27 is configured by push buttons. The return button 25 is a button for making an instruction to return to a previous state on the setting screen or the like. The return button 25 also functions as a cancel button and is used for making an instruction for cancellation. The playback button 26 is a button for making an instruction to switch to the playback mode. The function button 27 is a button for making an instruction to execute a preset function.

Figure 3:
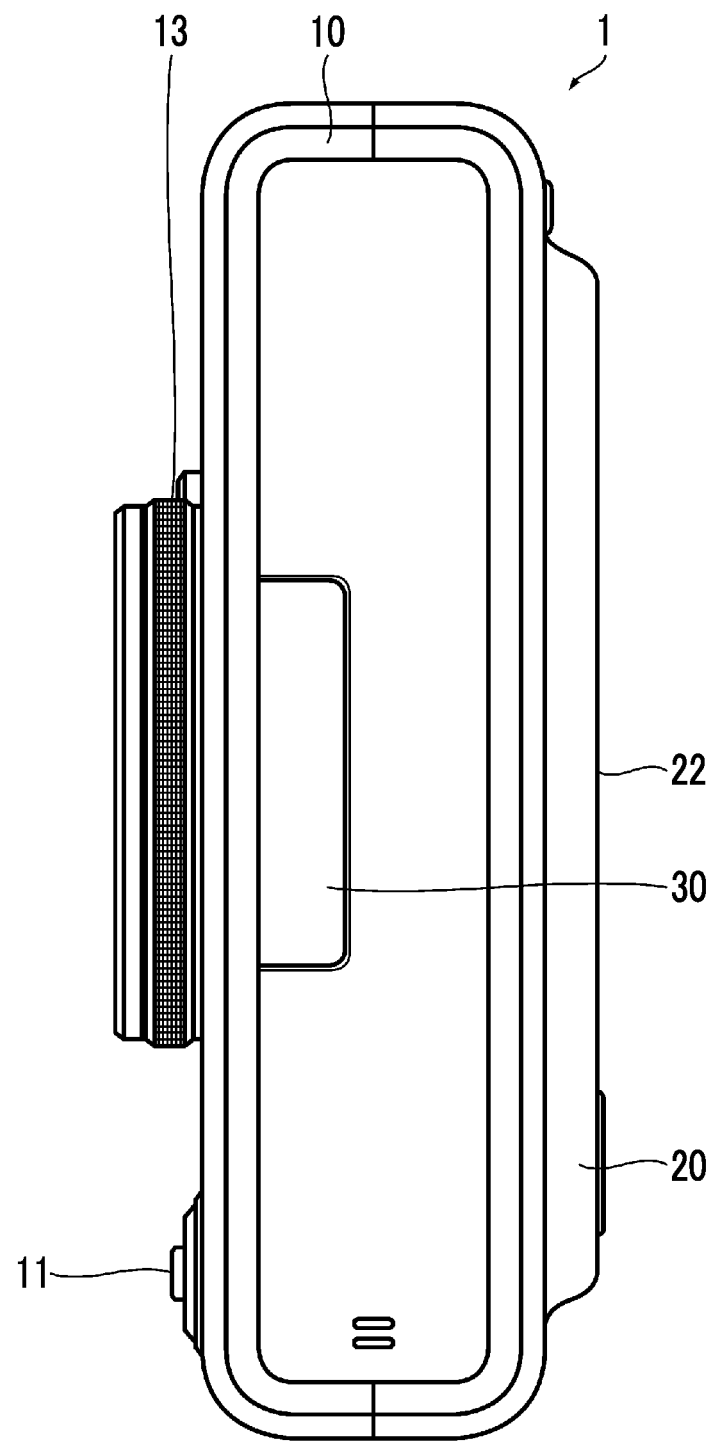
FIG. 3 is a right side view of the digital camera with the printer.

As shown in FIG. 3, a card slot cover 30 and the like are provided on a right side surface of the camera body 10. The card slot cover 30 is a cover member that covers a card slot (not shown) provided on the camera body 10. The card slot is exposed by opening the card slot cover 30.

Figure 4:
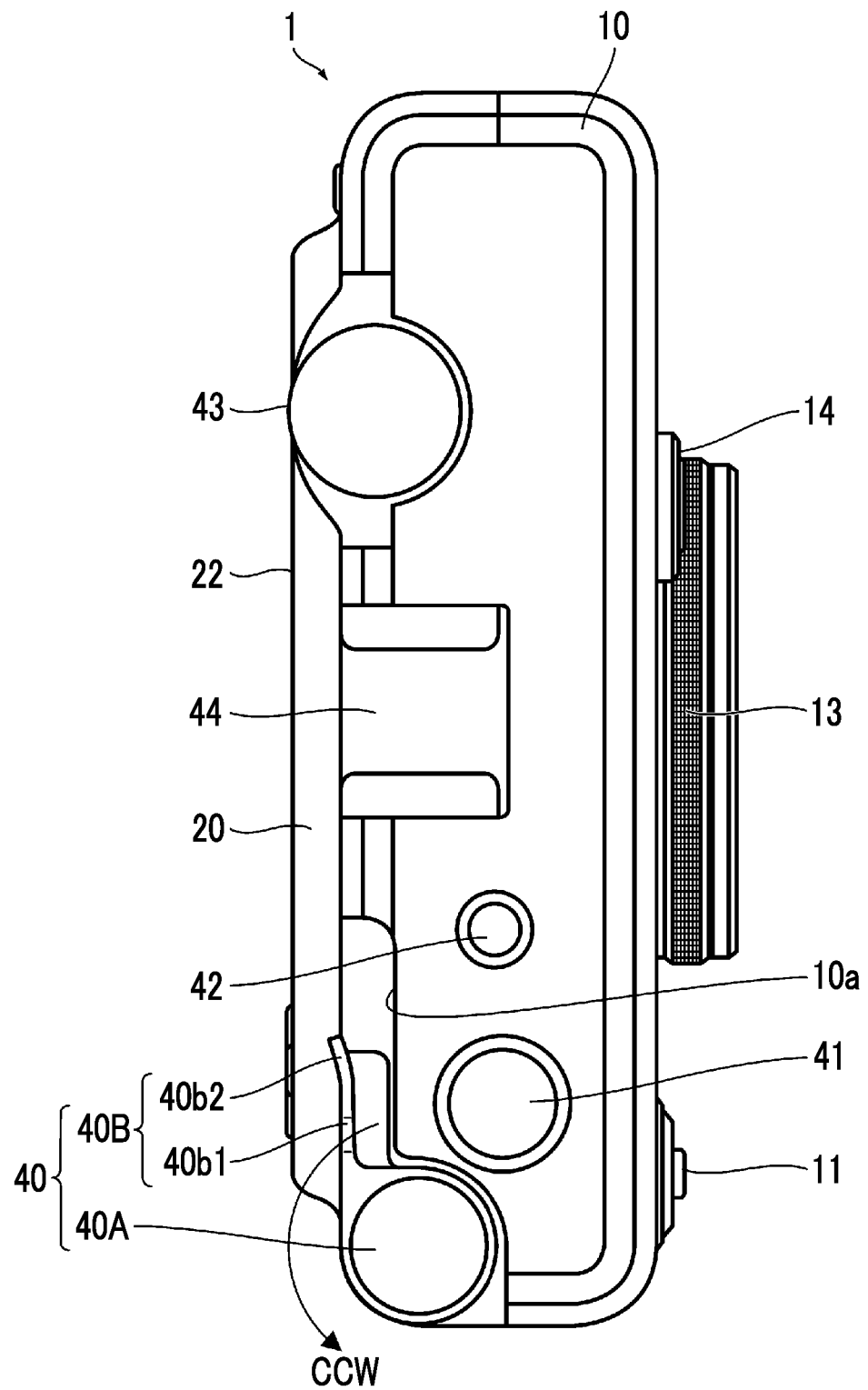
FIG. 4 is a left side view of the digital camera with the printer.

As shown in FIG. 4, an operation lever 40, a second shutter button 41, a reset button 42, an operation dial 43, an accessory shoe 44, and the like are provided on a left side surface of the camera body 10.

The operation lever 40 is an operation member that is rotated around a rotation axis. In the present embodiment, the operation lever 40 is an example of a first operation member. The operation lever 40 is disposed at a corner part on the rear surface side of the lower end portion of the left side surface of the camera body 10, and is rotated in a predetermined angle range with an axis orthogonal to the left side surface as the rotation axis. It should be noted that, as will be described later, the instant film is discharged upward from an upper surface of the camera body 10. Therefore, the rotation axis of the operation lever 40 is orthogonal to a discharge direction of the instant film. In addition, the instant film is discharged in a state of being parallel to the rear surface of the camera body 10. Therefore, the rotation axis of the operation lever 40 is disposed in parallel with the instant film discharged from the camera body 10.

The operation lever 40 has a shape imitating a film winding lever in a so-called film camera, and has a disc-shaped body part 40A and a rod-shaped lever part 40B extending from the body part 40A.

An end surface of the body part 40A is disposed substantially on the same surface as the left side surface of the camera body 10. In addition, the corner part between the rear surface and a lower surface of the camera body 10 has an arcuate shape (so-called rounded shape), and the shape has a shape along a peripheral surface of the body part 40A. The body part 40A is rotatably supported by the camera body 10 with its central axis as the rotation axis.

The lever part 40B has a linear lever body part 40b1 extending from an outer periphery of the body part 40A along a tangential direction, and a lever distal end part 40b2 provided at a distal end of the lever body part 40b1. The lever distal end part 40b2 has a shape curved outward (rear surface side of the camera body 10) toward the distal end of the lever body part 40b1. The lever distal end part 40b2 has a shape slightly protruding from the left side surface of the camera body 10 while the lever body part 40b1 forms substantially the same surface as the left side surface of the camera body 10 (see FIG. 2). By slightly protruding the distal end part from the left side surface of the camera body 10 in this way, the finger grip during the operation is improved.

The operation lever 40 is biased by a biasing mechanism (not shown) to be rotated within a predetermined angle range. An operation direction CCW is a counterclockwise direction in FIG. 4. On the other hand, a biasing direction by the biasing mechanism is a clockwise direction. Therefore, in a case in which the operation lever 40 is released, the operation lever 40 is rotated clockwise. The operation direction CCW is an example of a first direction. In addition, the biasing direction is an example of a second direction. As the biasing mechanism, for example, a mechanism using a torsion coil spring or the like can be adopted.

FIG. 4 shows a state in which the operation lever 40 is positioned at a reference position. In a non-operation state, the operation lever 40 is positioned at the reference position and stands still. As shown in FIG. 4, the operation lever 40 is accommodated in a cut-out part 10a formed in the camera body 10 in a state of being positioned at the reference position. The operation lever 40 accommodated in the cut-out part 10a has the lever body part 40b1 that forms substantially the same surface as the rear surface of the camera body 10. On the other hand, the lever distal end part 40b2 slightly protrudes from the rear surface portion of the camera body 10.

The operation lever 40 is rotated between the reference position and a command execution position. In the present embodiment, the reference position is an example of a first position. In addition, the command execution position is an example of a second position.

In addition, the operation of rotating the operation lever 40 to the command execution position against the biasing force by the biasing mechanism is an example of a first operation. In addition, the operation of releasing the operation lever 40 rotated to the command execution position against the biasing force is an example of a second operation.

Figure 7:
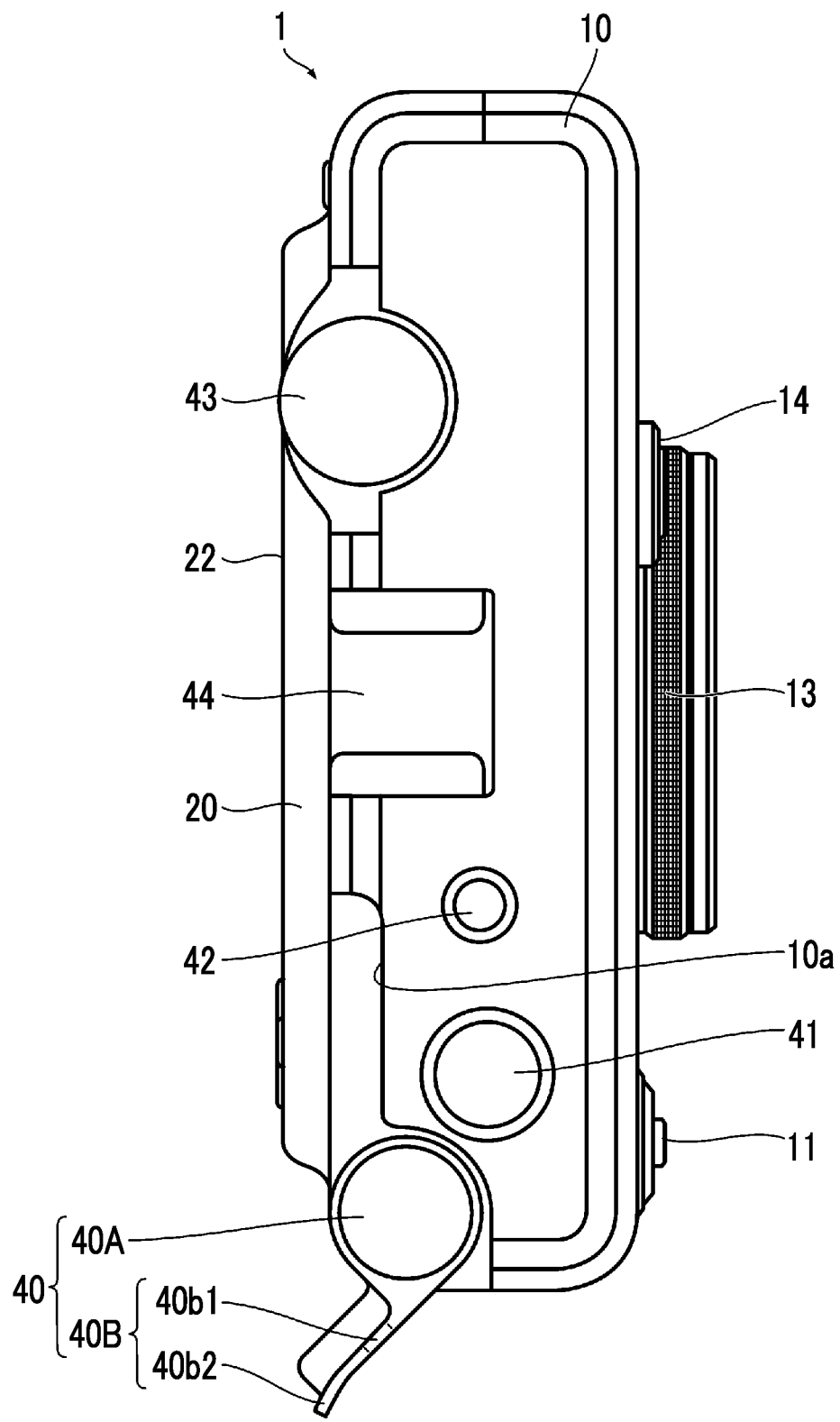
FIG. 7 is a left side view of the digital camera with the printer.

FIG. 7 is a left side view of the digital camera with the printer. FIG. 7 shows a state in a case in which the operation lever 40 is rotated to the command execution position.

In a case in which the operation lever 40 is rotated to the command execution position shown in FIG. 7, the rotation is restricted by a stopper (not shown).

Figure 8A:
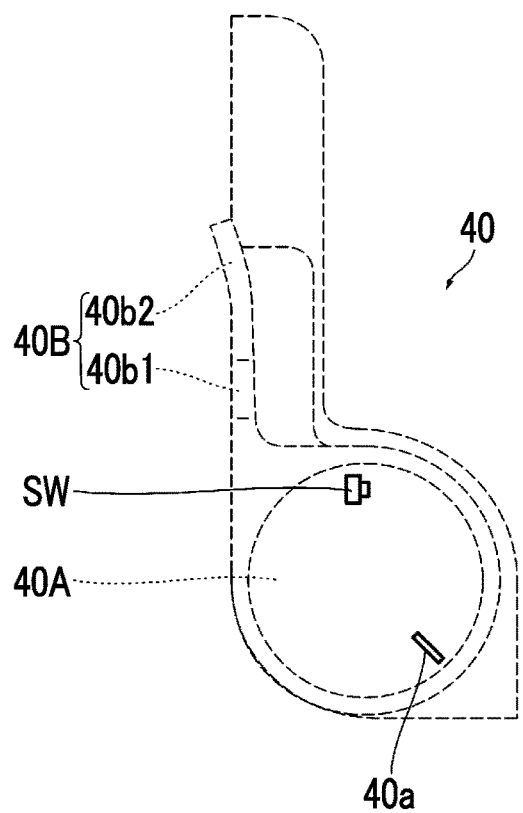
FIGS. 8A and 8B are conceptual diagrams of an operation structure of a switch.
Figure 8B:
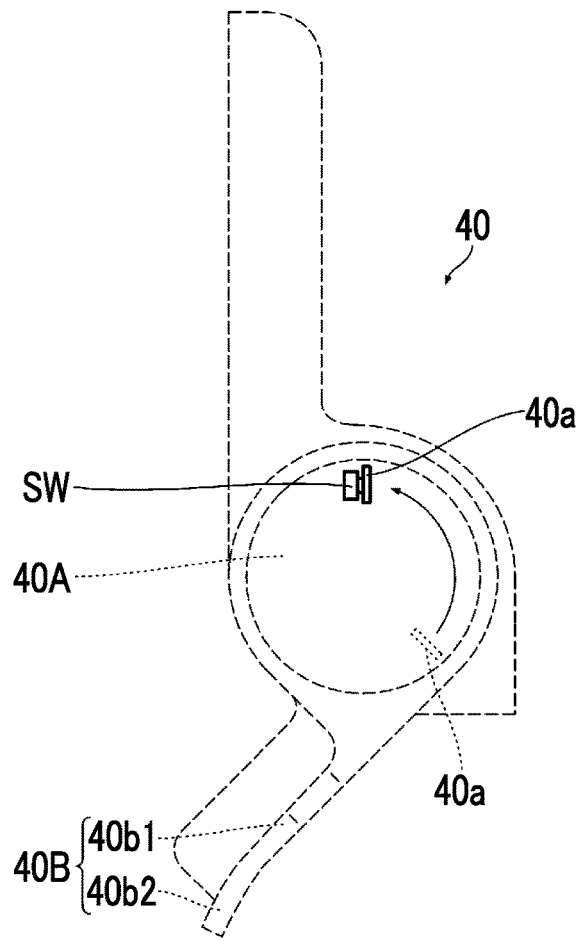

In addition, in a case in which the operation lever 40 is rotated to the command execution position shown in FIG. 7, an abutment part 40a provided inside the lever body part 40b1 abuts on a switch SW located inside the camera body 10 to turn on the switch SW. FIGS. 8A and 8B are conceptual diagrams of an operation structure of the switch. FIG. 8A shows a relationship between the abutment part 40a and the switch SW in a case in which the operation lever 40 is positioned at the reference position. FIG. 8B shows a relationship between the abutment part 40a and the switch SW in a case in which the operation lever 40 is positioned at the command execution position. As shown in FIG. 8A, in a case in which the operation lever 40 is positioned at the reference position, the abutment part 40a is separated from the switch SW. On the other hand, as shown in FIG. 8B, in a case in which the operation lever 40 is positioned at the command execution position, the abutment part 40a abuts on the switch SW. As a result, the switch SW is turned on. The switch SW is turned off in a case in which the abutment part 40a is separated from the switch SW.

As described above, the operation lever 40 is biased in a direction opposite (clockwise direction in FIG. 4) to the operation direction (counterclockwise direction in FIG. 4)

by the biasing mechanism (not shown). Therefore, the operation is performed against the biasing force by the biasing mechanism. In addition, in a case in which the operation lever 40 is released during the operation, that is, in a case in which the finger is separated, the operation lever 40 is returned to the reference position by the biasing force of the biasing mechanism. Therefore, in a case in which the operation lever 40 is rotated to the command execution position and the finger is separated, the switch SW is automatically turned off.

The operation lever 40 further comprises an operation sound generation mechanism (not shown), and a predetermined operation sound is generated during the operation. The operation sound is a so-called ratchet sound, and a sound similar to the sound generated in a case of a winding operation of the film in a film camera is generated. The operation sound generation mechanism mechanically generates the operation sound (ratchet sound).

A predetermined function is assigned to the operation lever 40 in accordance with the state of the camera. This point will be described in detail later.

Similar to the first shutter button 14, the second shutter button 41 is configured by a two-stage push button that can be half-pushed and fully pushed. A function of the second shutter button 41 is the same as that of the first shutter button 14. The second shutter button 41 is mainly used for the imaging in a lateral position. The imaging in the lateral position means the imaging in a direction in which a long side of the image to be captured is lateral (horizontal).

The reset button 42 is a button for making an instruction to reset various settings. The reset button 42 is configured by a push button.

The operation dial 43 is an operation member that is rotated around an axis orthogonal to the left side surface of the camera body 10 as the rotation axis. The operation dial 43 comprises a so-called click mechanism. Therefore, click feeling is given to the operation. In addition, the click is stopped at regular angular intervals. A predetermined function is assigned to the operation dial 43 in accordance with a mode of the camera. For example, in the imaging mode, the function of selecting the effect to be applied to the image is assigned. In addition, for example, in the playback mode, the functions of one frame advance and one frame return are assigned.

The accessory shoe 44 is used for mounting an external accessory, such as an external strobe.

Figure 5:
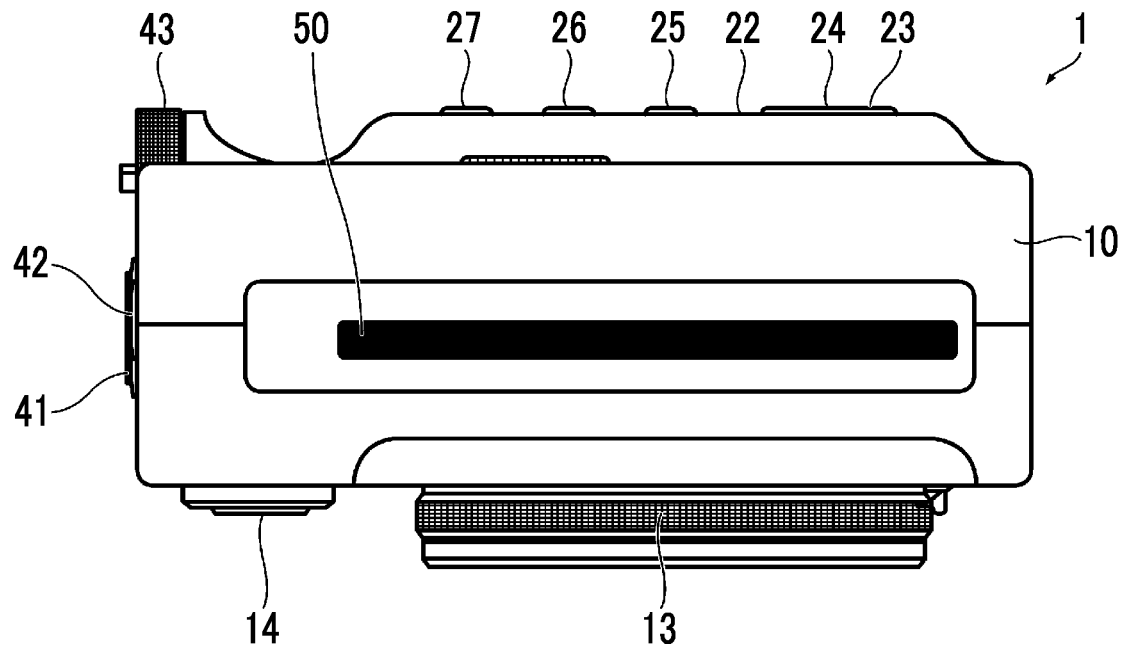
FIG. 5 is a plan view of the digital camera with the printer.

As shown in FIG. 5, a slit-shaped film discharge port 50 is provided on the upper surface of the camera body 10. The film discharge port 50 is disposed parallel to the rear surface of the camera body 10. The instant film on which the image is printed is discharged upward from the film discharge port 50. In this case, the instant film is discharged in a state in which an observation surface faces the rear surface side, and is discharged along the rear surface (see FIG. 16). It should be noted that, since the display 22 is provided on the rear surface of the camera body 10, the instant film is discharged along the display surface of the display 22. In the present embodiment, the upper part is an example of a predetermined direction.

Figure 6:
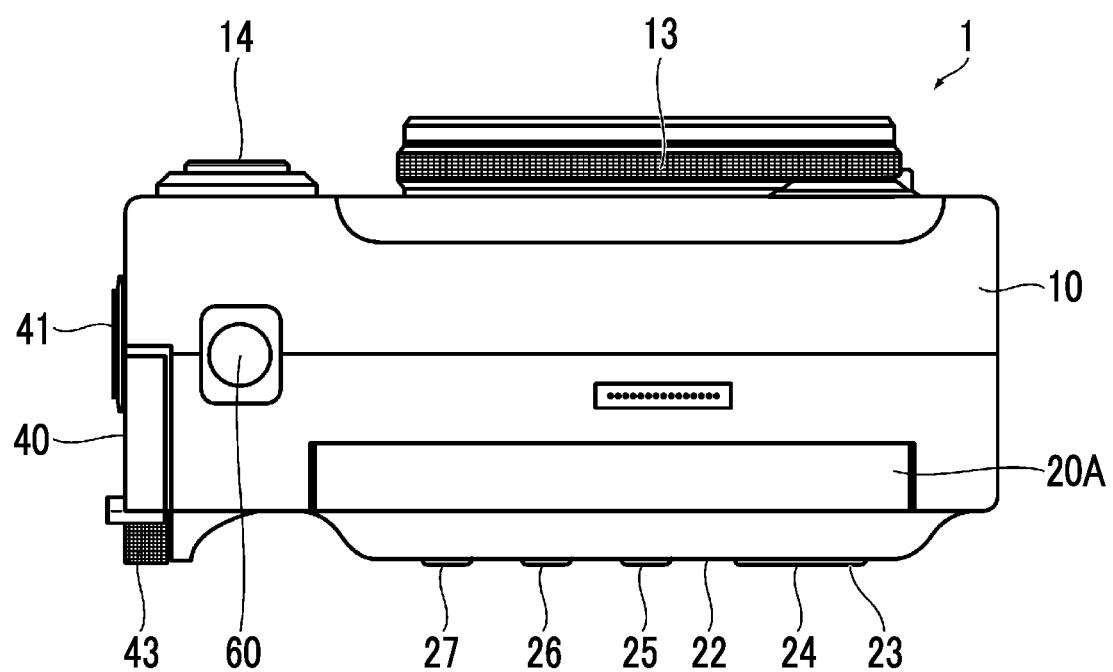
FIG. 6 is a bottom view of the digital camera with the printer.

As shown in FIG. 6, a power terminal 60 and the like are provided on the lower surface of the camera body 10. The power terminal 60 is used in a case of receiving the supply of power from an external power supply.

Internal Configuration of Digital Camera with Printer

Figure 9:
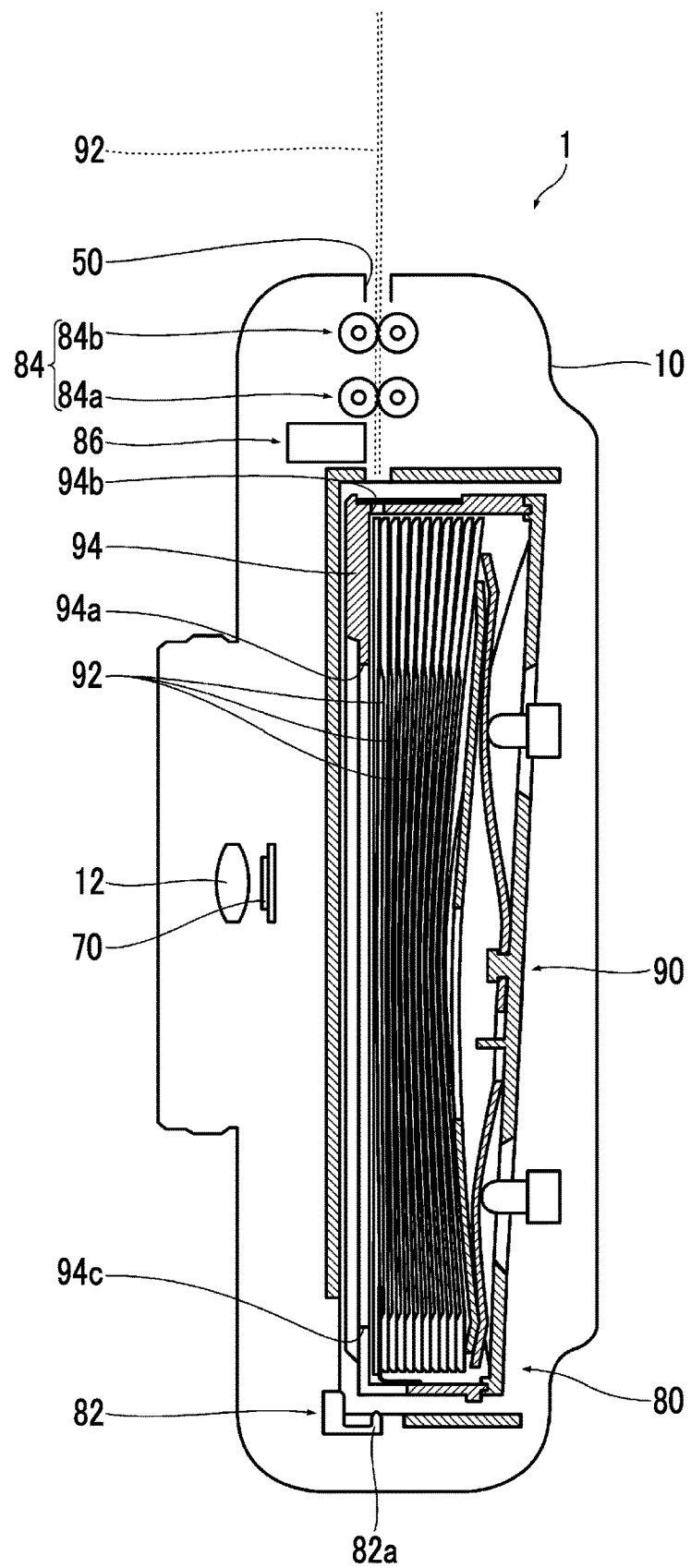
FIG. 9 is a diagram showing a schematic internal configuration of the digital camera with the printer.

FIG. 9 is a diagram showing a schematic internal configuration of the digital camera with the printer. FIG. 9 shows a main configuration related to the digital camera and the printer in the digital camera 1 with the printer.

Inside the digital camera 1 with the printer, a lens 12, an image sensor 70, and the like are provided as the configuration related to the digital camera. In addition, as the configuration related to the printer, an instant film pack 90, a film loading chamber 80, a film feeding mechanism 82, a film transport mechanism 84, a print head 86 and the like are provided.

Configuration Related to Digital Camera

As described above, the lens 12 is composed of a single focus lens. The focus of the lens 12 is adjusted by moving the focus lens back and forth along the optical axis. The lens 12 comprises a stop and a shutter (not shown). An amount of light passing through the lens 12 is adjusted by the stop. The shutter shields the light passing through the lens 12.

A color image sensor is used as the image sensor 70. As an example, in the present embodiment, a color complementary metal oxide semiconductor (CMOS) image sensor is used. In addition, a color charge coupled device (CCD) image sensor or the like can be used as the image sensor 70.

Configuration Related to Printer

The film loading chamber 80 is a loading part of the instant film pack 90. The film loading chamber 80 has a concave space in which the instant film pack 90 fits, and is opened and closed by the film door 20. The film loading chamber 80 is sealed in a dark room state by closing the film door 20.

The instant film pack 90 has a structure in which a plurality of instant films 92 are accommodated in a case 94.

Figure 10:
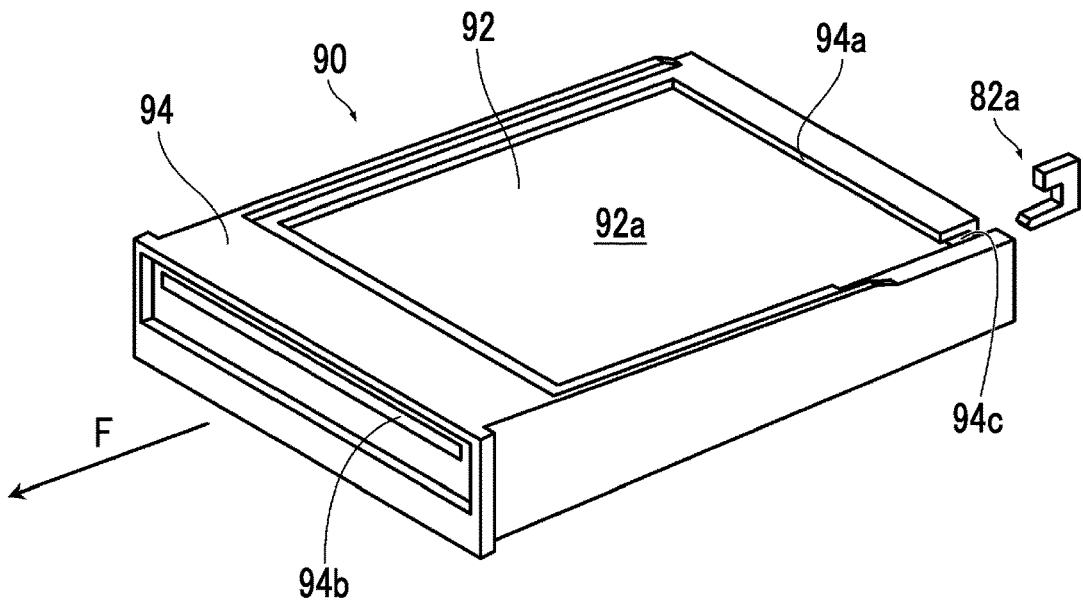
FIG. 10 is a perspective view of an instant film pack.
Figure 11:
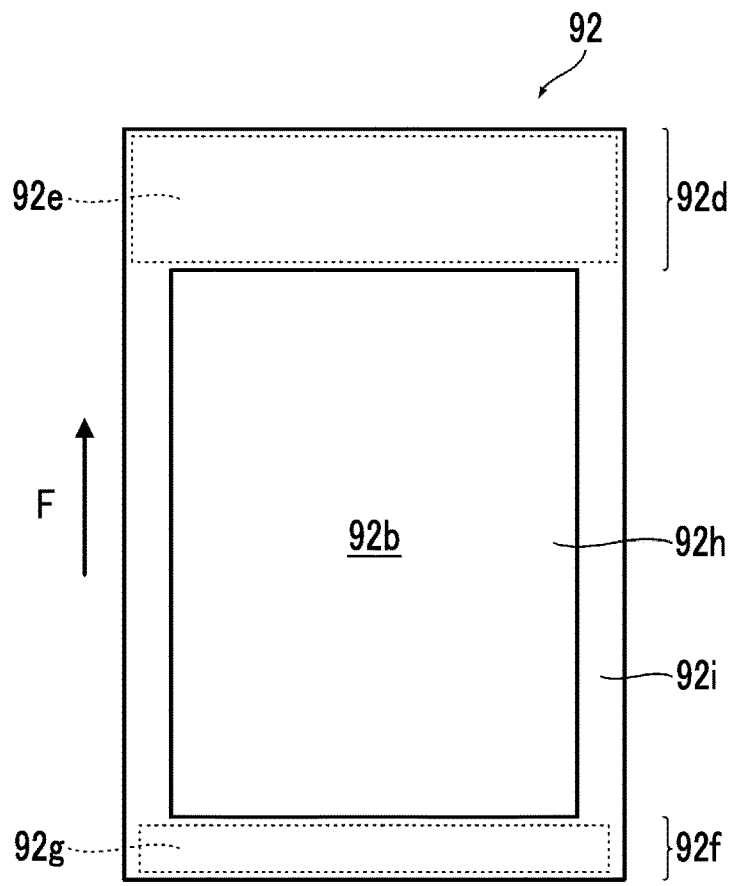
FIG. 11 is a front view of an instant film.
Figure 12:
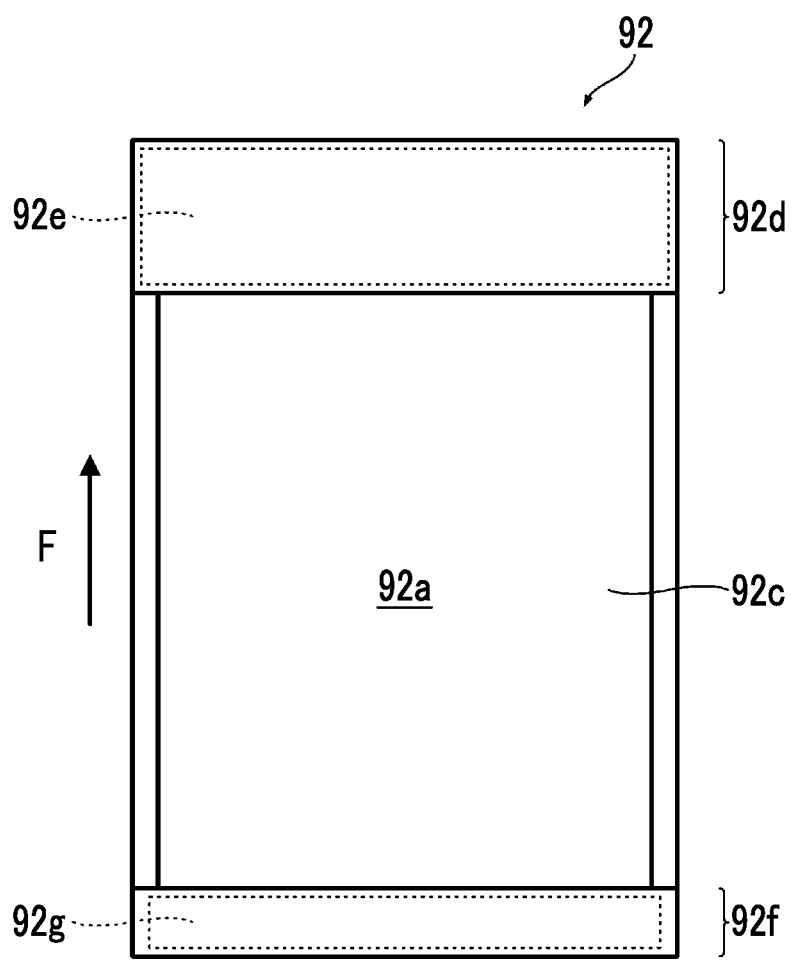
FIG. 12 is a rear view of the instant film.

FIG. 10 is a perspective view of the instant film pack. In addition, FIG. 11 is a front view of the instant film. FIG. 12 is a rear view of the instant film. It should be noted that, in FIGS. 10 to 12, a direction indicated by an arrow F is a feeding direction of the instant film 92. The instant film 92 is fed in the direction indicated by the arrow F and discharged from the case 94.

The instant film 92 is a so-called "mono-sheet type" (also referred to as a sheet film method, an integrated film or the like) instant film, and is an instant film of a type in which the image appears on the rear surface of the exposure surface.

As shown in FIGS. 11 and 12, the instant film 92 according to the present embodiment has a vertically long card shape. The instant film 92 is configured such that one surface is an exposure surface 92a and the other surface is an observation surface 92b. The exposure surface 92a is a surface on which the image is recorded by exposure, and the observation surface 92b is a surface on which the recorded image is observed.

As shown in FIG. 12, an exposure region 92c, a pod part 92d, and a trap part 92f are provided on the exposure surface 92a of the instant film 92.

The exposure region 92c is a region in which the image is recorded by exposure. The pod part 92d and the trap part 92f are disposed before and after the feeding direction F with the exposure region 92c interposed therebetween.

The pod part 92d is disposed on the front side in the feeding direction F with respect to the exposure region 92c. A development treatment liquid pod 92e encompassing a development treatment liquid is built in the pod part 92d.

The trap part 92f is disposed on the rear side of the feeding direction F with respect to the exposure region 92c. An absorbing material 92g is built in the trap part 92f.

As shown in FIG. 11, an observation region 92h is provided on the observation surface 92b of the instant film 92. The observation region 92h is a region in which the image is displayed. The instant film 92 according to the present embodiment has a vertically long shape in which the observation region 92h has an aspect ratio of 4:3 (vertical: lateral). By performing the development treatment on the exposure region 92c, the image is displayed in the observation region 92h. The observation region 92h is disposed corresponding to the exposure region 92c. A frame 92i is provided in the periphery of the observation region 92h. Therefore, the image is displayed in the frame. In addition, the observation region 92h is set slightly narrower than the exposure region 92c (set to be one size smaller). Therefore, in a case in which the image is recorded in the entire exposure region 92c, the image of which the periphery is trimmed is printed.

It should be noted that the instant film 92 is viewed in a direction in which the trap part 92f faces up and the pod part 92d faces down. Therefore, the image is printed in a direction in which the trap part 92f faces up and the pod part 92d faces down. As shown in FIG. 11, the pod part 92d has a wider width than the trap part 92f. Therefore, the observation surface 92b has a wide margin on the pod part 92d side.

After the exposure, the instant film 92 is subjected to the development treatment by spreading the development treatment liquid of the pod part 92d in the exposure region 92c. The development treatment liquid of the pod part 92d is squeezed out from the pod part 92d by passing the instant film 92 between a spreading roller pair 84b, and is spread in the exposure region 92c. The development treatment liquid left in a case of the spreading processing is trapped by the trap part 92f.

The case 94 has a rectangular box shape. The case 94 has a rectangular opening 94a for exposure in the front surface portion. In addition, the case 94 has a slit-shaped discharge port 94b on the top portion. The instant films 92 are stacked and accommodated in the case in a state in which the exposure surface 92a thereof faces the front surface side (opening 94a for exposure side) of the case 94 and the pod part 92d faces the top side (discharge port 94b side) of the case 94. In addition, the case 94 has a slit-shaped claw opening part 94c on the bottom portion. The instant film 92 accommodated in the case 94 is fed one by one toward the discharge port 94b by allowing a claw 82a to enter through the claw opening part 94c, and is discharged from the discharge port 94b.

A plurality (for example, 10) of the instant films 92 are accommodated in one instant film pack 90.

The film feeding mechanism 82 feeds the instant films 92 one by one from the instant film pack 90 loaded in the film loading chamber 80. The film feeding mechanism 82 comprises a claw 82a that is moved back and forth along the feeding direction of the instant film 92, and scrapes out the instant films 92 in the case one by one by the claw 82a, and feeds the instant films 92 from the instant film pack 90.

The film transport mechanism 84 transports the instant film 92 fed from the instant film pack 90 by the film feeding mechanism 82 at a certain speed. The film transport mechanism 84 comprises a transport roller pair 84a and the spreading roller pair 84b. The transport roller pair 84a is driven by a motor (not shown) to be rotated, and interposes both sides of the instant film 92 to transport the instant film 92. The spreading roller pair 84b is driven by a motor (not shown) to be rotated, and interposes the entire instant film 92 to transport the instant film 92. The instant film 92 is subjected to the development treatment by pressing the pod part 92d in the process of being transported by the spreading roller pair 84b.

The print head 86 records the image on the instant film 92 fed from the instant film pack 90. The print head 86 is configured by a line type exposure head. The print head 86 irradiates the exposure surface 92a of the instant film 92 transported by the film transport mechanism 84 with print light line by line, and records the image on the instant film 92 in a single pass.

Electric Configuration of Digital Camera with Printer

Figure 13:
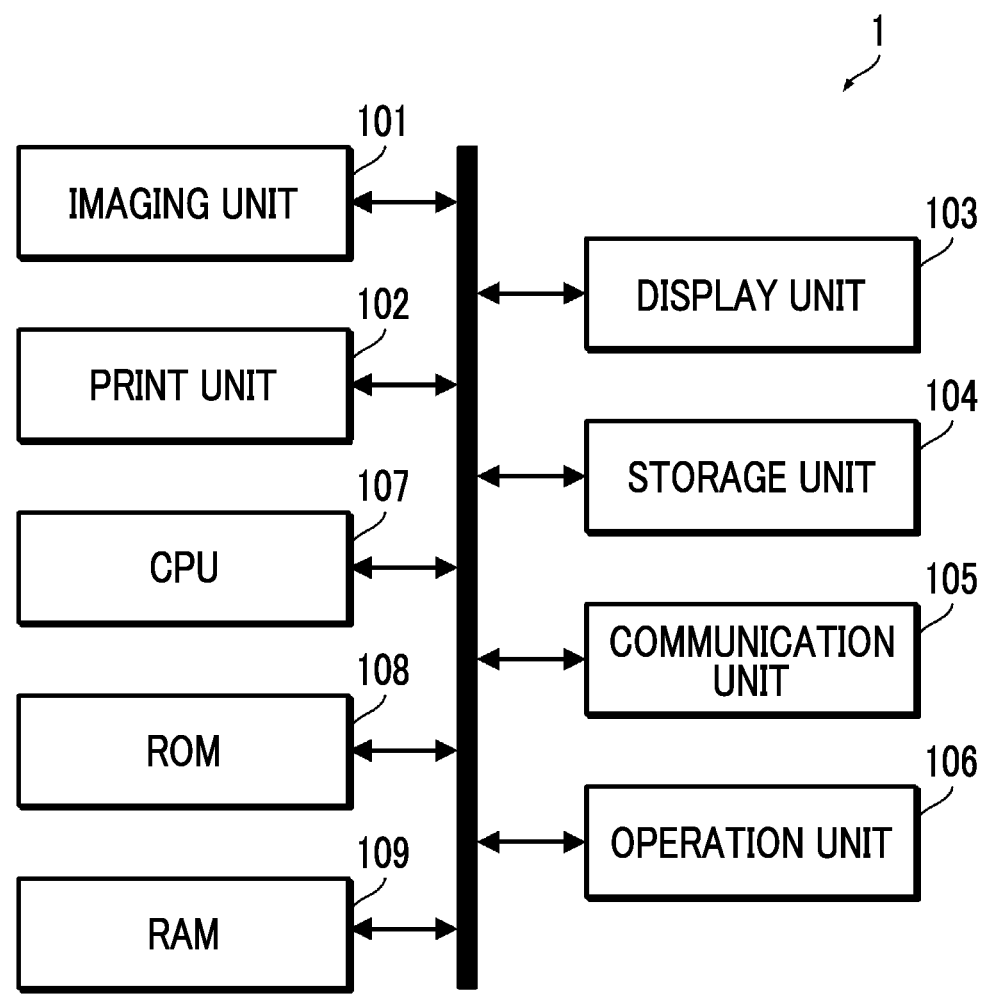
FIG. 13 is a block diagram showing an outline of an electric configuration of the digital camera with the printer.

FIG. 13 is a block diagram showing an outline of an electric configuration of the digital camera with the printer.

As shown in FIG. 13, the digital camera 1 with the printer comprises an imaging unit 101, a print unit 102, a display unit 103, a storage unit 104, a communication unit 105, an operation unit 106, a central processing unit (CPU) 107, a read only memory (ROM) 108, a random access memory (RAM) 109, and the like.

The imaging unit 101 constitutes a digital camera portion of the digital camera 1 with the printer. The imaging unit 101 includes the lens 12, the image sensor 70, and the like, and electrically captures the image of the subject.

The print unit 102 constitutes a printer portion of the digital camera 1 with the printer. The print unit 102 includes the film feeding mechanism 82, the film transport mechanism 84, the print head 86, and the like, and prints the image on the instant film to discharge the printed image.

The display unit 103 includes the display 22 and a drive circuit thereof. As described above, the display 22 is used for displaying the live view and the captured image, and is also used for displaying the setting screen in a case of making various settings.

The storage unit 104 is used for storing the captured image data and also for storing various types of data. The storage unit 104 is configured by an internal memory and an external memory. The internal memory is configured by, for example, a semiconductor memory having non-volatile properties, such as an electrically erasable programmable read-only memory (EEPROM), or a solid state drive (SSD) having these semiconductor memories built therein. The external memory is configured by a memory card loaded in the card slot.

The communication unit 105 wirelessly communicates with an external apparatus. As an example, short-range wireless communication is used for the communication. Specifically, Bluetooth (registered trademark) is used. In addition, Wi-Fi (registered trademark), infrared communication, or the like can also be used for the communication. In addition, a configuration can also be adopted in which the communication is performed by wire.

The operation unit 106 includes the power lever 11, the operation ring 13, the first shutter button 14, the cross key 23, the MENU/OK button 24, the return button 25, the playback button 26, the function button 27, the operation lever 40, the second shutter button 41, the reset button 42, the operation dial 43, and the like. Each operation member outputs the signal corresponding to the operation to the CPU 107.

The CPU 107 collectively controls the operation of the digital camera 1 with the printer. In addition, the CPU 107 performs various types of processing related to the imaging, the playback, and the print.

During the imaging, the CPU 107 performs imaging control, such as the AE and the AF, display control, such as live view, recording control of the captured image, and the like. In addition, the CPU 107 performs processing of generating the image data from the output of the image sensor 70 during the imaging. Further, the CPU 107 performs processing of processing the image data in accordance with the instruction from a user during the imaging.

The CPU 107 also performs processing, such as processing the image data, in accordance with the instruction from the user during the playback. In addition, the recording control of the processed image data and the like are also performed.

The CPU 107 performs feeding control of the instant film 92, transport control of the instant film 92, drive control of the print head 86, and the like as the control related to the print. In addition, during the print, processing of generating data for the print is performed. That is, processing of generating the data for printing a target image on the instant film by the print head 86 is performed.

The ROM 108 stores a program executed by the CPU 107 and various data necessary for control or the like.

The RAM 109 is used as a work region in a case in which the CPU 107 performs various types of processing.

Basic Operation of Digital Camera with Printer

Here, basic operations of the imaging, the playback, and the print of the digital camera 1 with the printer will be described.

Imaging

The imaging is performed by setting the mode of the digital camera 1 with the printer to the imaging mode. In a case in which the power of the digital camera 1 with the printer is turned on, the digital camera 1 with the printer is activated in the imaging mode.

In a case in which the imaging mode is set, the live view is displayed on the display 22. That is, the image captured by the image sensor 70 via the lens 12 is displayed on the display 22 in real time.

In a case in which the first shutter button 14 or the second shutter button 41 is half-pushed in a state in which the live view is displayed on the display 22, the preparation for the imaging is performed. That is, the AE, the AF, and the like are controlled. After half-pushing the first shutter button 14 or the second shutter button 41, in a case in which the button is fully pushed, the main imaging is performed. That is, the image for recording is captured.

The image obtained by the main imaging is recorded in the storage unit 104. In addition, in a case in which the main imaging is performed, the captured image is displayed on the display 22 for a certain time (so-called post view). In a case in which a certain time has elapsed from the start of the post view, or in a case in which the first shutter button 14 or the second shutter button 41 is half-pushed while the post view is being displayed, the post view display is terminated and switched to the live view display.

It should be noted that a configuration can also be adopted in which the recording of the captured image is performed in accordance with the instruction of the user. In this case, the captured image is displayed on the display 22 (so-called preview). The user makes the instruction of whether or not the recording of the image displayed on the display 22 is necessary. For example, by pushing the MENU/OK button 24, the recording is instructed, and by pushing the return button 25, the cancellation is instructed.

Whether or not to automatically record the captured image depends on the setting by the user. This setting is made, for example, on a menu screen.

In a case in which the print is instructed during the post-viewing or the previewing, the image during the post-viewing or the previewing is printed. That is, the captured image is printed. The print instruction is made by the operation lever 40. This point will be described in detail later.

Playback

The captured image is played back by setting the mode of the digital camera 1 with the printer to the playback mode. Switching from the imaging mode to the playback mode is performed by pushing the playback button 26.

In a case in which the playback mode is set, the last captured image is displayed on the display 22. Thereafter, in a case in which the operation ring 13 or the operation dial 43 is rotated in a forward direction, one frame is advanced. That is, the next image is played back. In addition, in a case in which the operation ring 13 or the operation dial 43 is rotated in an opposite direction, one frame is returned. That is, the previous image is played back.

In a case in which the print is instructed during the image playback, the image being played back, that is, the image being displayed on the display 22 is printed. The print instruction is made by the operation lever 40. This point will be described in detail later.

Print

As described above, the print operation is performed by the operation lever 40. That is, while the target image is being displayed on the display 22, the operation of the operation lever 40 is instructed to execute the print. The print execution instruction by the operation lever 40 is made by rotating the operation lever 40 to the command execution position and then releasing the operation lever 40. Specifically, the print execution instruction is performed by rotating the operation lever 40 to the command execution position and then separating the finger. Since the operation lever 40 is biased in the direction opposite to the operation direction by the biasing mechanism, the operation lever 40 is returned to the reference position by separating the finger. In addition, during the operation, the operation sound (ratchet sound) is generated at regular angular intervals. As a result, the operation is more clearly communicated to the user.

In the digital camera 1 with the printer according to the present embodiment, the displaying of the display 22 is changed in conjunction with the print operation by the operation lever 40. That is, predetermined displaying is performed on the display 22 such that it can be seen that the image being displayed is printed. In the following, the print operation by the operation lever 40 and the details of the displaying on the display 22 will be described.

Here, the print in the imaging mode will be described. In particular, a case will be described in which the captured image is printed in the mode of post-viewing the captured image.

Figure 14:
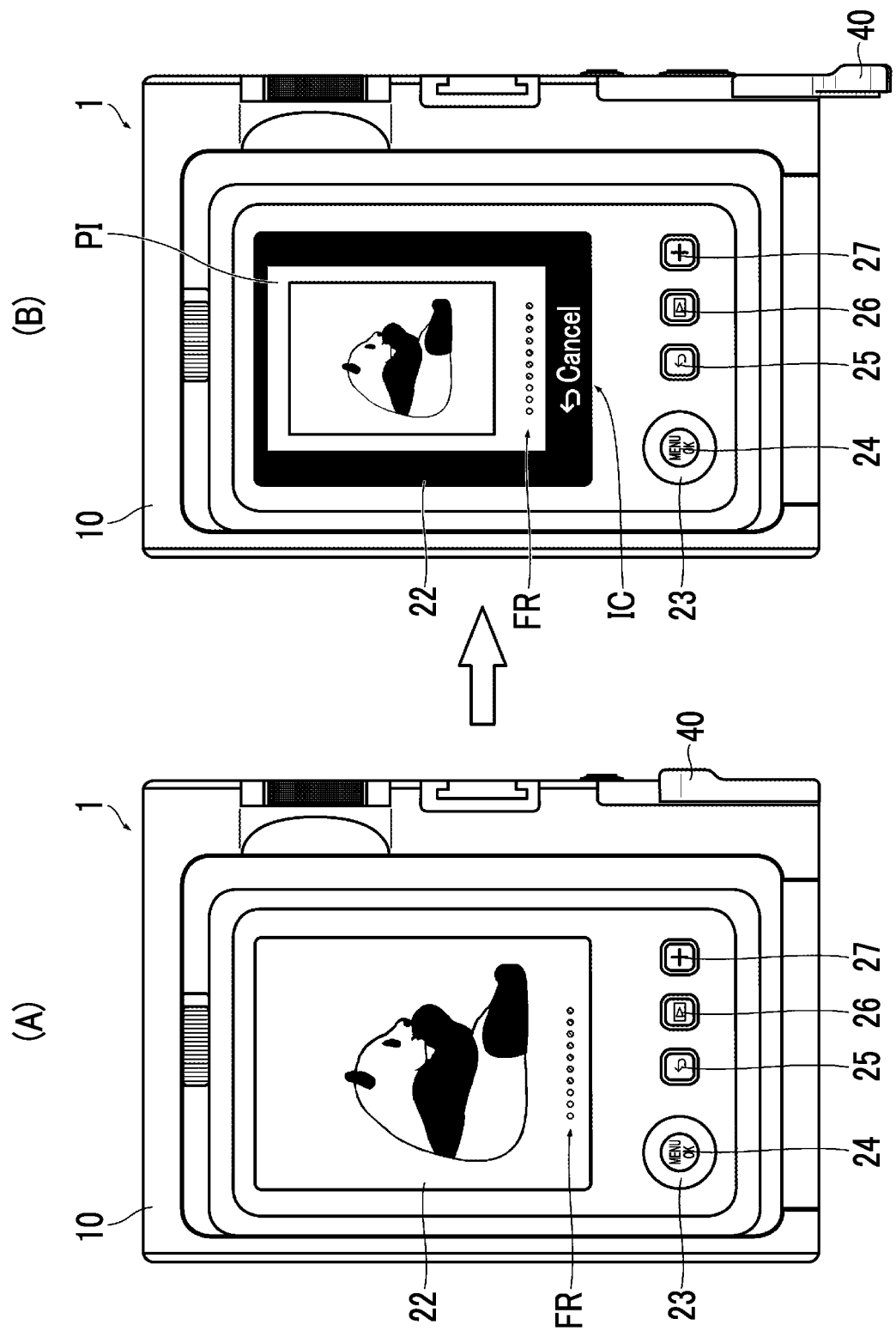
FIG. 14 is a diagram showing a relationship between an operation of an operation lever and displaying of a display.

FIG. 14 is a diagram showing a relationship between the operation of the operation lever and the displaying of the display. (A) of FIG. 14 shows a state during the post view. (B) of FIG. 14 shows a state immediately before the print execution is instructed.

As shown in (A) of FIG. 14, in the mode of post-viewing the captured image, in a case in which the imaging is performed, the captured image is displayed on the display 22. The image is displayed for a certain time. The user may be able to optionally set this time.

It should be noted that, in FIG. 14, the reference numeral FR is film remaining amount display indicating a remaining amount of the loaded instant film. The film remaining amount display FR is configured by arranging dots side by side in a lateral row at regular intervals. The number of dots is the same as the number of instant films loaded in an unused instant film pack. The color is changed in order from the left each time the instant film pack is used. As an example, the color is changed from gray to white. (A) of FIG. 14 shows a state in which three sheets are used. The film remaining amount display FR is also displayed on a live view image and the like.

In a case in which the operation lever 40 is rotated to the command execution position while the captured image is being displayed on the display 22, the image being displayed is set as the print target image.

It should be noted that the switch SW detects that the operation lever 40 is rotated to the command execution position. As described above, the switch SW is turned on in a case in which the operation lever 40 is rotated to the command execution position. Therefore, it is possible to detect that the operation lever 40 is rotated to the command execution position by detecting that the switch SW is turned on.

In a case in which the operation lever 40 is rotated to the command execution position and the image being displayed is set as the print target image, the preparation for the print is started. First, the data for the print is generated. That is, the data for printing the print target image on the instant film by the print head 86 is generated. Simultaneously, as shown in (B) of FIG. 14, an image picture PI of the print is generated and displayed on the display 22. The image picture PI of the print is an image showing the result of the print as shown in (B) of FIG. 14. In the present embodiment, since the image is printed on the instant film, the image of the instant film on which the print target image is printed is generated as the image picture PI. More specifically, the image of the instant film on which the print target image is displayed in the observation region of the observation surface is generated as the image picture PI. This image is an image in which the print target image is contained in the frame. The frame is a frame similar to the frame 92i that constitutes the observation surface 92b of the instant film 92.

The display 22 displays an animation showing that the print target image is continuously or stepwise switched to the image picture PI.

Figure 15:
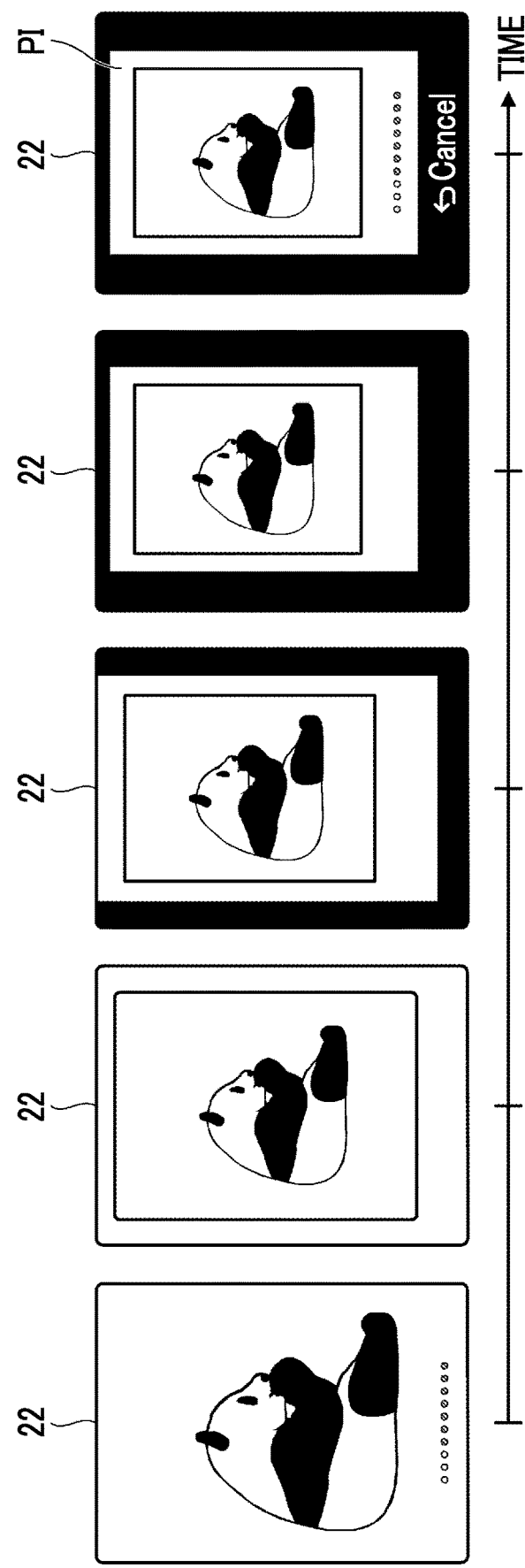
FIG. 15 is a diagram showing a temporal change in the displaying of the display.

FIG. 15 is a diagram showing a temporal change in the displaying of the display. FIG. 15 shows a change in the displaying of the display 22 in a case in which the image being displayed on the display is set as the print target image.

As shown in FIG. 15, a state in which the image set as the print target image is gradually switched to the image picture PI is displayed by the animation. Specifically, a state in which the image being displayed on the display 22 is gradually reduced and is contained in the frame of the instant film is displayed by the animation.

In a case in which the image picture PI of the print is displayed on the display 22, an information IC for canceling the print is displayed in the margin region (region in the periphery of the image picture PI of the print) as shown in (B) of FIG. 14.

As shown in (B) of FIG. 14, the information IC for canceling the print is configured by character information of "Cancel" and a predetermined symbol. This information is displayed in a lower left position of the image picture PI of the print.

Here, in the digital camera 1 with the printer according to the present embodiment, the print cancellation is performed by pushing the return button 25. In a case in which the return button 25 is pushed after setting the print target image and before making the instruction to execute the print, the setting of the print target image is canceled and the print is canceled. The symbol displayed together with the character information of "Cancel" as the information for canceling the print is a symbol printed on a surface of the return button 25. As a result, it is possible to recognize that the print can be canceled by pushing the return button 25. In the present embodiment, the return button 25 is an example of a second operation member.

As described above, the print is executed by releasing the operation lever 40 that has been rotated to the command execution position. In a case in which the print execution is instructed, print processing is started. That is, the instant film 92 is unwound from the instant film pack 90, and the image is printed (exposed) on the exposure surface by the print head 86. The printed image is discharged upward from the film discharge port 50 provided on the upper surface of the camera body 10. In this case, the instant film 92 is discharged in a state in which the observation surface 92b faces the rear surface side of the camera body 10 and is parallel to the rear surface of the camera body 10 (parallel to the display surface of the display 22).

It should be noted that the release of the operation lever 40 is detected by the switch SW. As described above, the switch SW is turned on in a case in which the operation lever 40 is rotated to the command execution position. Therefore, by detecting that the switch SW is turned from ON to OFF, it is possible to detect that the operation lever 40 is released. The released operation lever 40 is automatically rotated in the direction opposite to the operation direction by the biasing force of the biasing mechanism, and is returned to the reference position.

In a case in which the print is executed, the displaying on the display 22 is also changed.

Figure 16:
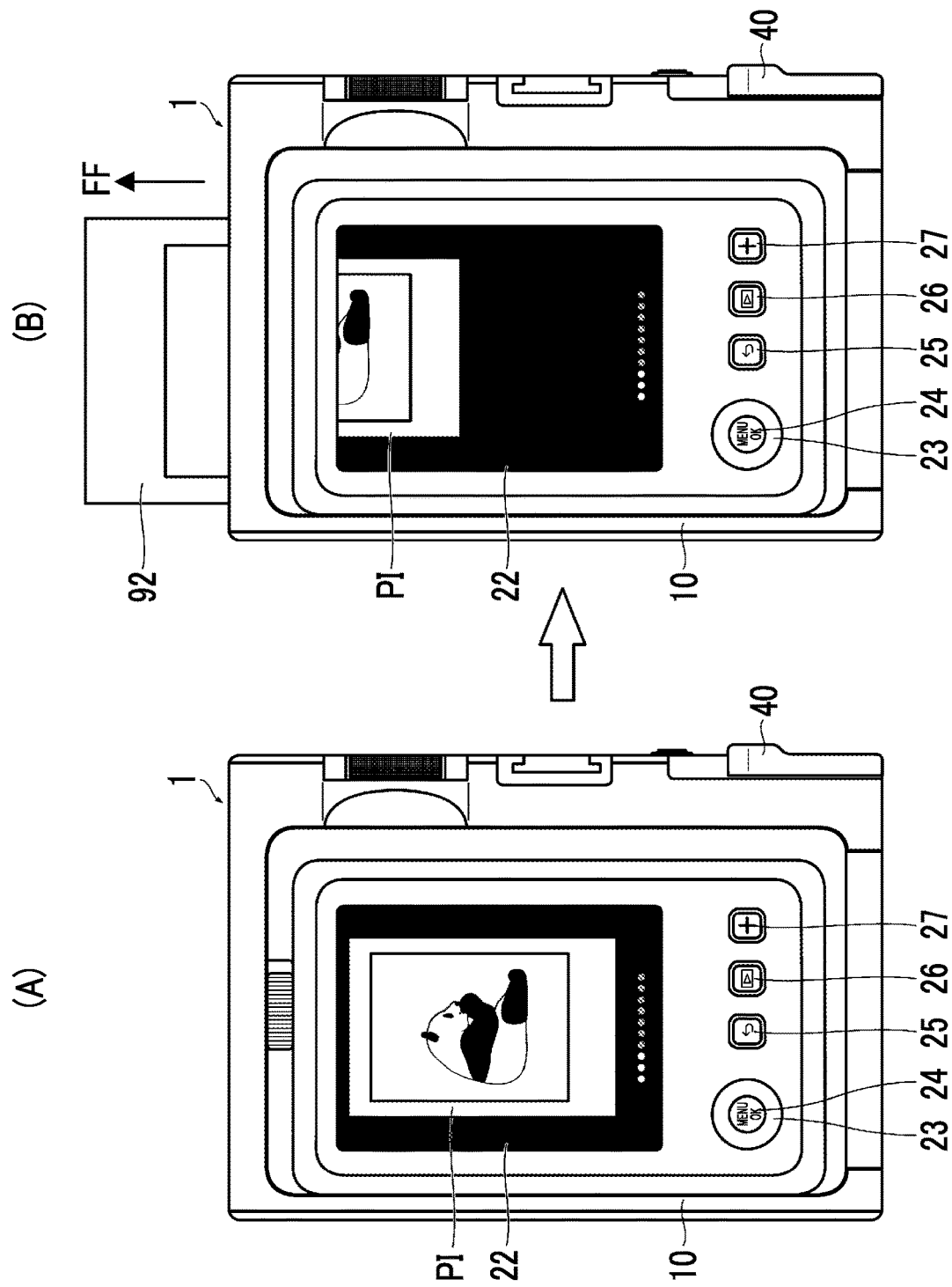
FIG. 16 is a diagram showing a relationship between the print of the image and the displaying of the display.

FIG. 16 is a diagram showing a relationship between the print of the image and the displaying of the display. (A) of FIG. 16 shows the displaying of the display immediately after the print execution instruction is made. (B) of FIG. 16 shows the displaying of the display during the print.

As shown in FIG. 16, in conjunction with the discharge of the instant film 92, the image picture PI being displayed on the display 22 is moved along a discharge direction FF of the instant film 92.

Figure 17:
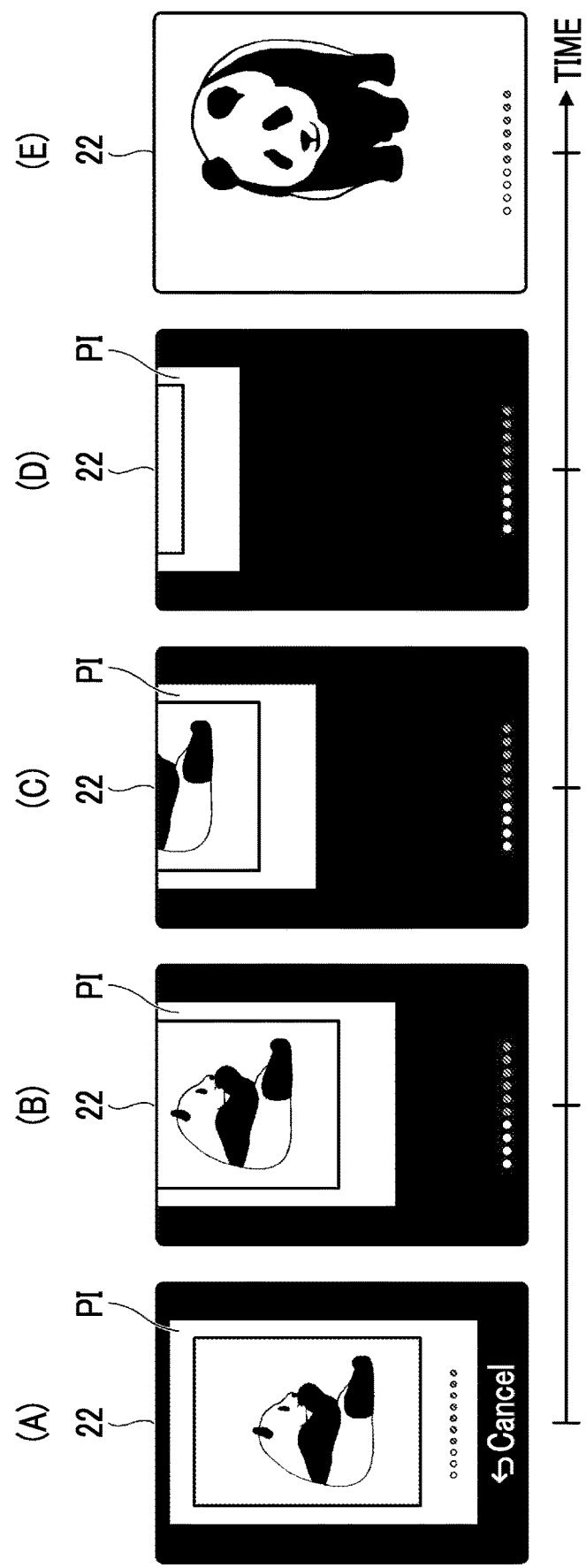
FIG. 17 is a diagram showing a temporal change in the displaying of the display during the print.

FIG. 17 is a diagram showing a temporal change in the displaying of the display during the print. (A) of FIG. 17 shows the displaying of the display 22 immediately before the print is executed. (B) to (D) of FIG. 17 show the displaying of the display 22 during the print. (E) of FIG. 17 shows the displaying of the display 22 after the print is completed.

As shown in (B) to (D) of FIG. 17, in a case in which the print is executed, a state in which the image picture PI of the print is moved upward (=discharge direction of the instant film) and disappears from the upper side of the display 22 is displayed by the animation. A timing at which the image picture PI of the print disappears from the display 22 and a timing at which the print is completed (timing at which the discharge of the instant film is completed) substantially coincide with each other.

In a case in which the print is completed, the displaying of the display 22 is switched to the live view as shown in (E) of FIG. 17. As a result, next imaging can be performed.

It should be noted that the printed instant film 92 is not completely discharged from the camera body 10, but is discharged from the film discharge port 50 in a state in which a part of the printed instant film 92 is left in the camera body. More specifically, a rear end portion thereof in the transport direction is discharged in a state of being interposed between the spreading roller pair 84b. The user manually pulls out and collects the instant film 92 which has been discharged.

Figure 18:
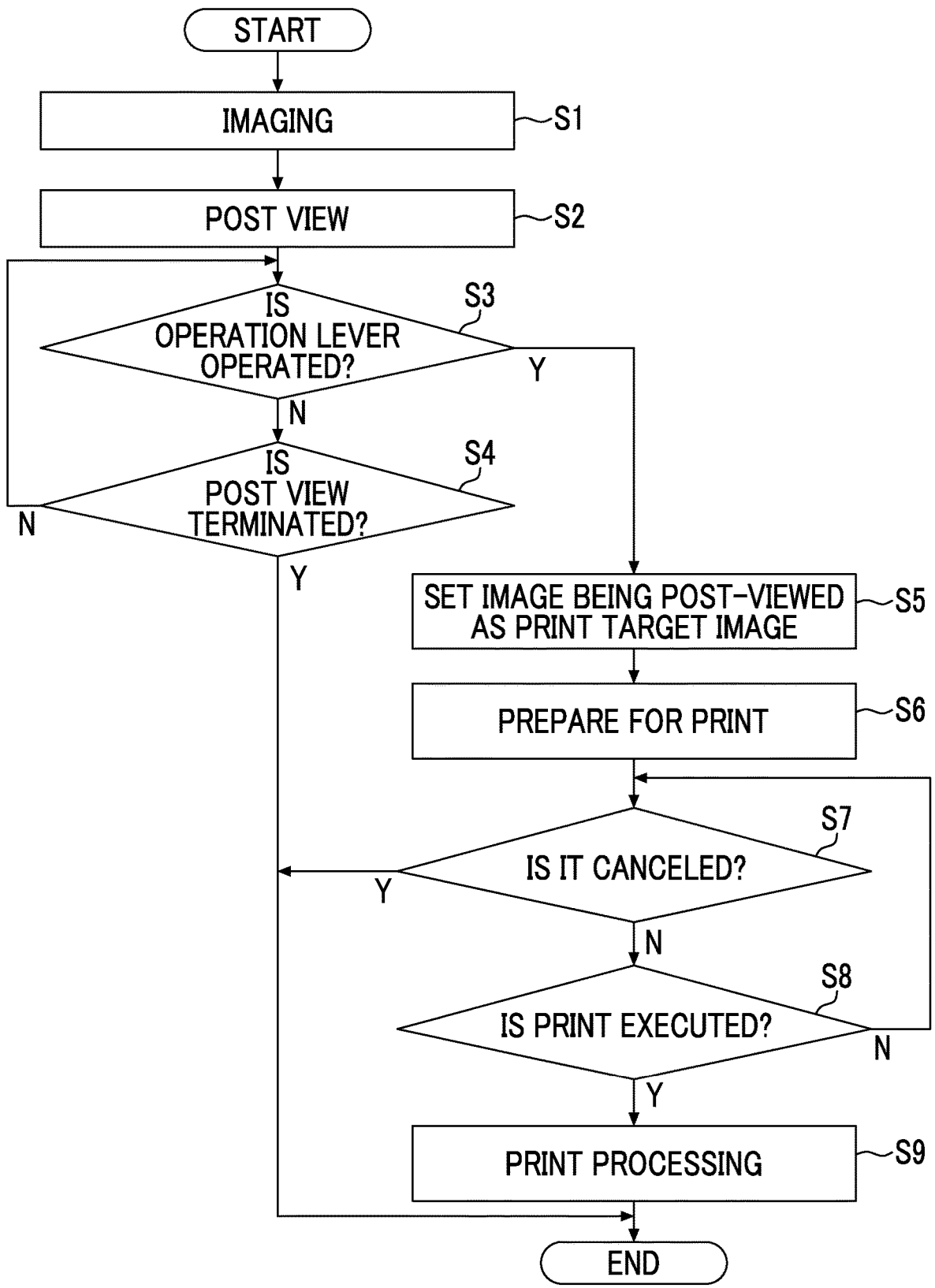
FIG. 18 is a flowchart showing an operation procedure of the print in an imaging mode.

FIG. 18 is a flowchart showing an operation procedure of the print in the imaging mode. It should be noted that FIG.

18 shows a procedure of the print operation in the mode of post-viewing the captured image.

First, the imaging is performed (step S1). In a case in which the imaging is performed, the captured image is post-viewed (step S2). That is, the captured image is displayed on the display 22. The post view is performed for a certain time.

During the post view, it is determined whether or not there is the operation of the operation lever 40 (step S3). Specifically, it is determined whether or not the operation lever 40 is rotated to the command execution position.

In a case in which it is determined that the operation lever 40 is operated during the post view, the image during the post-viewing (image being displayed on the display 22) is set as the print target image (step S5).

On the other hand, in a case in which it is determined that the operation lever 40 is not operated, it is determined whether or not the post view is terminated (step S4). In a case in which the post view continues, the processing is returned to step S3, and it is determined whether or not there is the operation of the operation lever 40.

It should be noted that the post view is terminated after a certain time has elapsed from the start, and is also terminated by half-pushing the first shutter button 14 or the second shutter button 41.

In a case in which the operation lever 40 is operated and the image during the post-viewing is set as the print target image, the preparation for the print is performed (step S6). That is, the data for printing the image set as the print target image is generated. In addition, the image picture of the print is generated simultaneously with this, and is displayed on the display 22 (see FIG. 14). The image picture of the print is displayed by the animation (see FIG. 15).

Thereafter, it is determined whether or not there is the instruction to cancel the print (step S7). The instruction to cancel the print is made by operating the return button 25. Therefore, it is determined whether or not there is the instruction to cancel the print depending on whether or not there is the operation of the return button 25.

In a case in which the print cancellation is instructed, the processing is terminated. In this case, the print is not executed even in a case in which the operation lever 40 is released. In a case in which the processing is terminated, the displaying of the display 22 is switched to the live view display.

On the other hand, in a case in which it is determined that there is no cancellation instruction, it is determined whether or not there is the print execution instruction (step S8). That is, it is determined whether or not the operation lever 40 is released.

In a case in which it is determined that the operation lever 40 is released, the print processing is executed (step S9). That is, the image for which the print is instructed (captured image in the present example) is printed on the instant film 92 and discharged from the film discharge port 50. In conjunction with this print processing, the image picture PI being displayed on the display 22 is moved along the discharge direction of the instant film 92 and disappears from the screen (see FIG. 17).

The above is the procedure of the print operation in the mode of post-viewing the captured image, but the captured image can also be printed by the same operation procedure even in the mode of previewing the captured image. That is, by operating the operation lever 40 (rotating the operation lever 40 to the command execution position and releasing the operation lever 40) during the preview, the captured image can be printed. In addition, in the playback mode, the print can be performed by operating the operation lever 40 (rotating the operation lever 40 to the command execution position and releasing the operation lever 40) in a state in which the image desired to be printed is displayed on the display 22.

As described above, with the digital camera 1 with the printer according to the present embodiment, it is possible to print the image being displayed on the display 22 only by operating the operation lever 40. Since the operation of the operation lever 40 is only rotating the operation lever 40 to a predetermined position and releasing the operation lever 40, it is possible to easily make the print instruction. In addition, since the direction in which the operation lever 40 is rotated in a case of being released coincides with the discharge direction of the instant film, the operation can be easily understood.

Functions of Operation Ring and Operation Dial

The operation ring 13 and the operation dial 43 function as operation units for the frame advance and the frame return in the playback mode, and also have the following functions in the imaging mode. That is, each of the operation ring 13 and the operation dial 43 has a function of selecting a type of the image processing to be performed on the image to be captured (including the live view image). However, the types of the image processing that can be selected between the operation ring 13 and the operation dial 43 are different.

The operation ring 13 mainly functions as an operation unit that selects the type of the image processing of the lens system. The image processing of the lens system (lens effect) is the image processing in which the same effect as the effect obtained in a case in which a specific lens is used is obtained. For example, examples thereof include processing into an image in which an amount of peripheral light is reduced, a soft focus image, a so-called toy camera image, a high key image, and a low key image. In the present embodiment, the operation ring 13 is an example of a third operation member. In addition, the image processing (image processing of the lens system) that can be selected by operating the operation ring 13 is an example of first image processing.

On the other hand, the operation dial 43 mainly functions as an operation unit that selects a type of the image processing of a film system. The image processing of the film system (film effect) is the image processing in which the same effect as the effect obtained in a case in which the film is changed in a so-called film camera is obtained. For example, examples thereof include processing into monochrome or sepia. In addition, the image processing of the film system includes processing of changing tone (color shade or intensity), gradation (softness or hardness), and the like. In the present embodiment, the operation dial 43 is an example of a fourth operation member. In addition, the image processing (image processing of the film system) that can be selected by operating the operation dial 43 is an example of second image processing.

In the operation ring 13, as a default setting, an unprocessed state is selected, and the selected type of the image processing is switched each time the operation ring 13 is rotated by one click. The same applies to the operation dial 43, and as a default setting, an unprocessed state is selected, and the selected type of the image processing is switched each time the operation dial 43 is rotated by one click.

Figure 19:
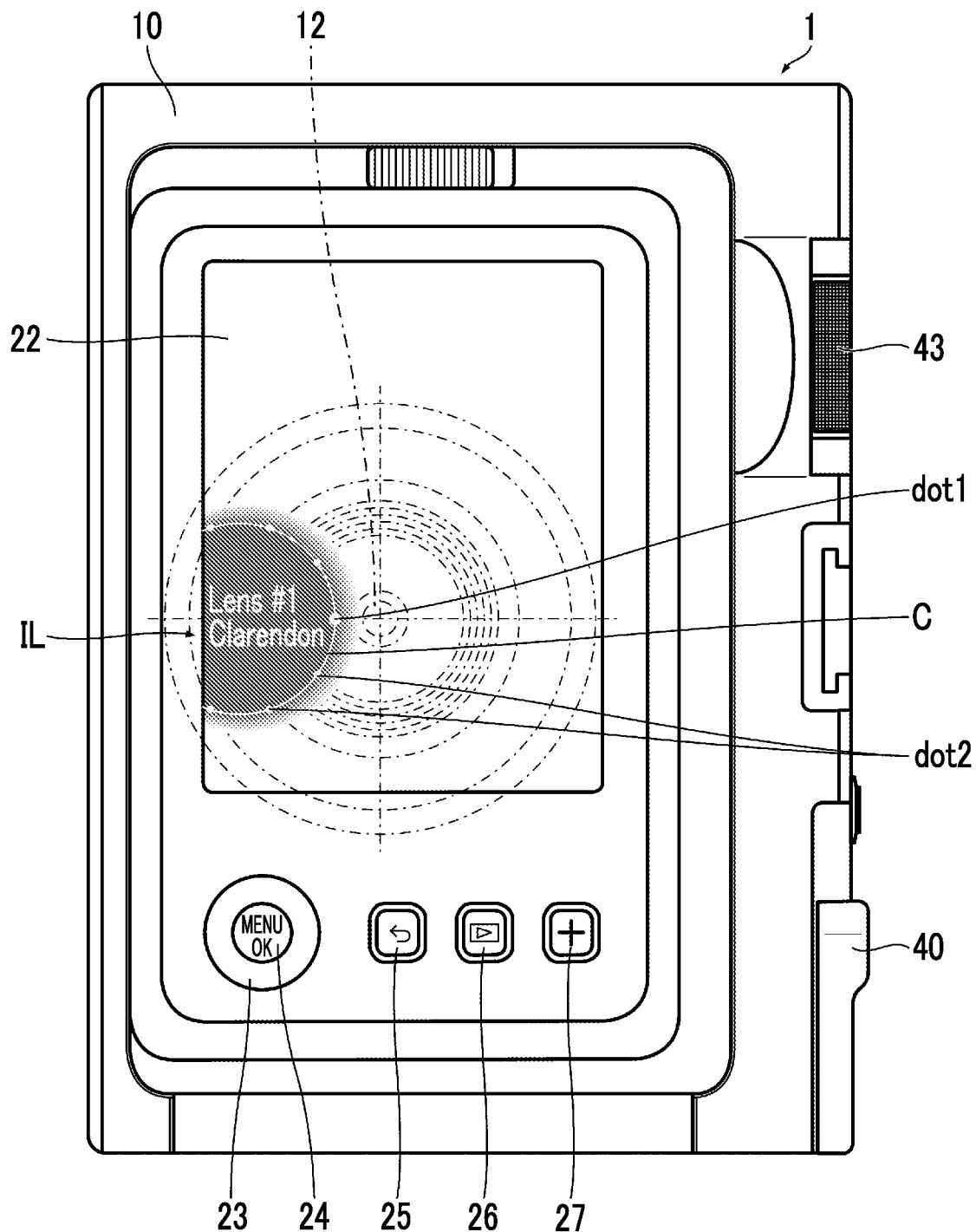
FIG. 19 is a diagram showing the displaying of the display in a case in which an operation ring is operated.

FIG. 19 is a diagram showing the displaying of the display in a case in which the operation ring is operated.

As shown in FIG. 19, in a case in which the operation ring 13 is operated, the lens effect graphical user interface (GUI) is displayed on the display 22. The lens effect GUI is formed of a circle C having a partially cut-out shape and a plurality of dots displayed at regular intervals on the circle C.

A part of the circle C is displayed to be seen from the left side of the display 22. In addition, the circle C is disposed at a position at substantially the same height as the optical axis of the lens 12 in a height direction (up-down direction) of the camera body 10. That is, the circle C is disposed at the same height as the rotation axis of the operation ring 13.

The dot is formed of one large dot dot1 and a plurality of small dots dot2. The large dot dot1 is disposed at a position at substantially the same height as the optical axis of the lens 12 in the height direction of the camera body 10. In a case in which the operation ring 13 is operated, the small dots dot2 are moved on the circle C along the operation direction.

Inside the circle C, information IL on the type of the image processing currently selected is displayed. The information IL is formed of "Lens #n XXX". The "Lens" indicates that the image processing is selected by the operation of the operation ring 13. The number of the selected image processing is displayed in "n" of "#n". The name of the selected image processing is displayed in "XXXX". In the example shown in FIG. 19, an example is shown in a case in which the image processing of the number "1" and the name "Clarendon" is selected.

In a case in which the operation ring 13 is operated, the lens effect GUI appears from the left side of the screen, is displayed for a predetermined time, and then disappears from the screen. In a case in which the lens effect GUI disappears, the lens effect GUI disappears to sink into the left side of the screen.

Figure 20:
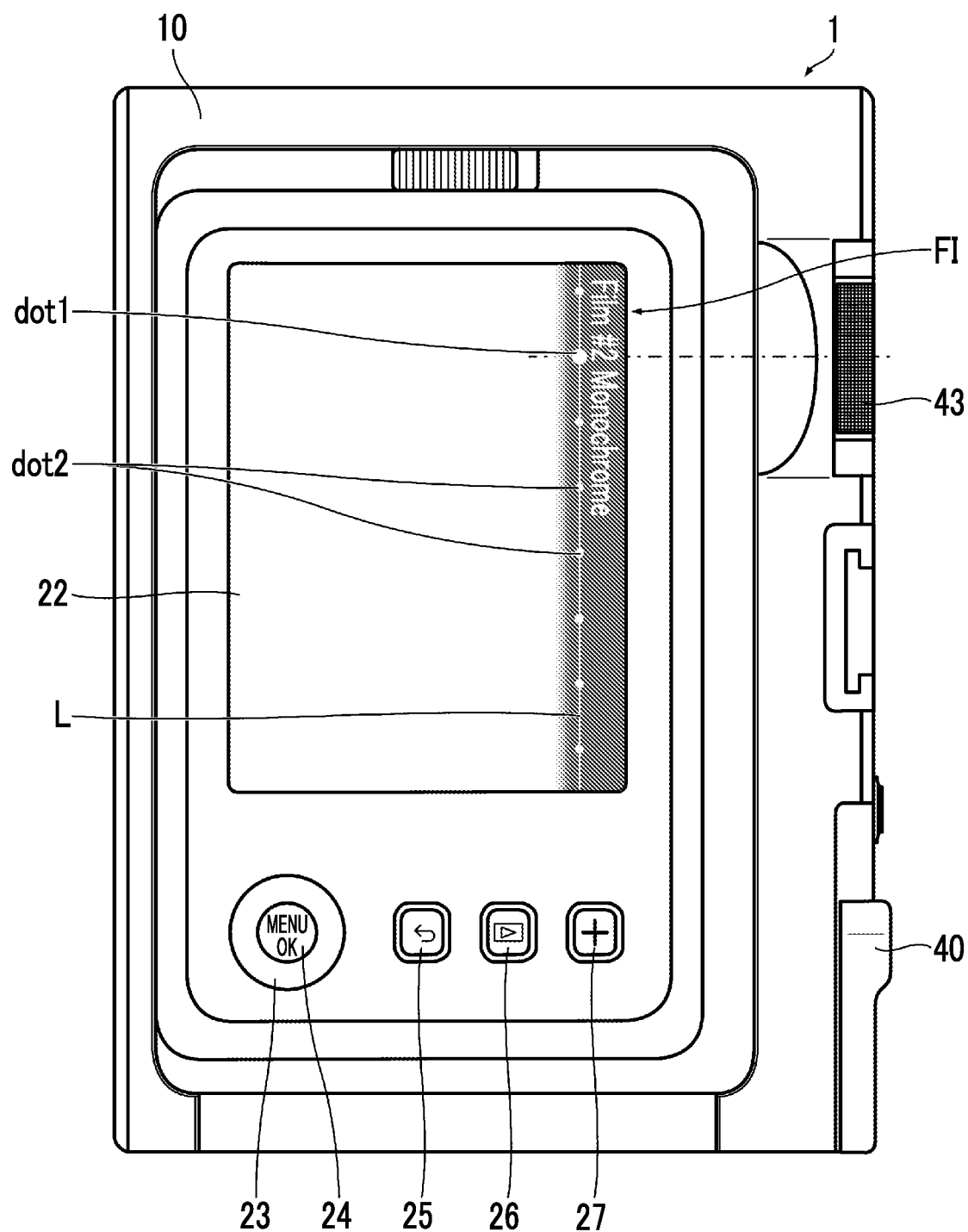
FIG. 20 is a diagram showing the displaying of the display in a case in which an operation dial is operated.

FIG. 20 is a diagram showing the displaying of the display in a case in which the operation dial is operated.

As shown in FIG. 20, in a case in which the operation dial 43 is operated, the film effect GUI is displayed on the display 22. The film effect GUI is formed of a straight line L extending along the up-down direction of the display 22 and a plurality of dots displayed at regular intervals on the straight line L. The straight line L is disposed at a position close to the right end of the display 22. The direction in which the straight line L extends coincides with the operation direction (up-down direction) of the operation dial 43 on the rear surface of the camera body 10.

The dot is formed of one large dot dot1 and the plurality of small dots dot2. The large dot dot1 is disposed at a position at substantially the same height as the position of the rotation axis of the operation dial 43 in the height direction of the camera body 10. In a case in which the operation dial 43 is operated, the small dots dot2 are moved on the straight line L along the operation direction.

At the right end of the display 22, information IF on the type of the image processing currently selected is displayed along the straight line L. The information IF is formed of "Film #n XXX". The "Film" indicates that the image processing is selected by the operation of the operation dial 43. The number of the selected image processing is displayed in "n" of "#n". The name of the selected image processing is displayed in "XXXX". In the example shown in FIG. 20, an example is shown in a case in which the image processing of the number "2" and the name "Monochrome" is selected.

In a case in which the operation dial 43 is operated, the film effect GUI appears from the right side of the screen, is displayed for a predetermined time, and then disappears from the screen. In a case in which the film effect GUI disappears, the film effect GUI disappears to sink into the right side of the screen.

The operation ring 13 and the operation dial 43 allow the two types of the image processing to be used in combination. Therefore, for example, in a case in which m types of the image processing can be selected by the operation ring 13 and n types of the image processing can be selected by the operation dial 43, n×m types of the image processing can be performed as a whole.

It should be noted that, in a case in which the operation dial 43 is operated while the lens effect GUI is being displayed, the displaying of the display 22 is switched to the film effect GUI. In a case in which the displaying is switched, the lens effect GUI disappears to the left side of the screen, and the film effect GUI appears from the right side of the screen instead.

In addition, in a case in which the operation ring 13 is operated while the film effect GUI is being displayed, the displaying of the display 22 is switched to the lens effect GUI. In a case in which the displaying is switched, the film effect GUI disappears to the right side of the screen, and the lens effect GUI appears from the left side of the screen instead.

The lens effect GUI and the film effect GUI are displayed as a semi-transparent image superimposed on the image being displayed on the display 22.

The image processing is also performed on the live view image. That is, the operations of the operation ring 13 and the operation dial 43 are instantly reflected in the live view image. Therefore, the user can confirm what kind of the image processing is performed by confirming the live view image.

Modification Example

Print Cancellation

In the embodiment described above, the configuration is adopted in which the print cancellation is instructed by operating the return button 25 before the print execution is instructed, but a configuration can also be adopted in which the print can be canceled even after the print execution instruction. For example, a configuration can also be adopted in which a waiting time can be provided at the start of the print processing and the print can be canceled during the waiting time. The waiting time is an example of a time T.

Figure 21:
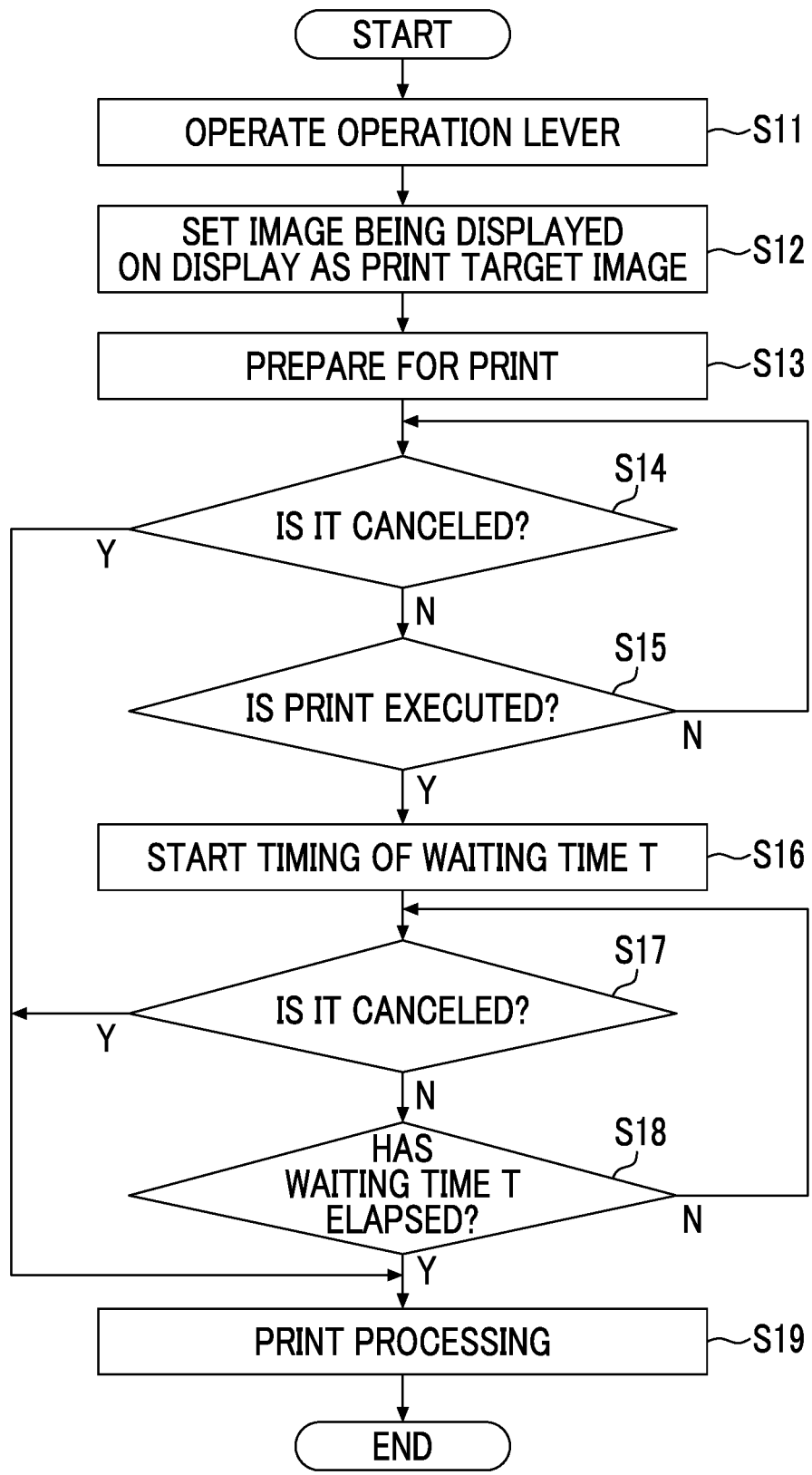
FIG. 21 is a flowchart showing the operation procedure of the print.

FIG. 21 is a flowchart showing the operation procedure of the print.

First, the operation lever 40 is rotated to the command execution position (step S11), so that the image being displayed on the display 22 is set as the print target image (step S12). In addition, by setting the image being displayed on the display 22 as the print target image, the preparation for the print is performed (step S13).

Here, it is determined whether or not there is the cancellation instruction before the print execution instruction (step S14). That is, it is determined whether or not the return button 25 is operated. In a case in which the cancellation is instructed before the print execution instruction, the processing is terminated.

On the other hand, in a case in which there is no cancellation instruction, it is determined whether or not there is the print execution instruction (step S15). That is, it is determined whether or not the operation lever 40 is released.

In a case in which the print execution is instructed, the print processing is started after waiting for the elapse of the waiting time T. Therefore, in a case in which the print execution is instructed, timing is started in order to confirm the elapse of the waiting time T (step S16).

After the start of the timing, it is determined whether or not there is the cancellation instruction after the print execution instruction (step S17). The cancellation instruction is made by operating the return button 25 in the same manner as before the print execution instruction. In a case in which the cancellation is instructed, the processing is terminated.

On the other hand, in a case in which there is no cancellation instruction, it is determined whether or not the waiting time T has elapsed (step S18). In a case in which the waiting time T has not elapsed, the processing is returned to step S17, and it is determined whether or not there is the cancellation instruction.

On the other hand, in a case in which the waiting time T has elapsed, the print processing is started (step S19).

In this way, the configuration can also be adopted in which the print can be canceled even after the print execution instruction is made. As a result, even in a case in which the print execution is instructed by mistake, the print can be canceled after the fact. In addition, for example, even in a case in which the operation lever 40 is unintentionally operated (for example, in a case in which the operation lever 40 is caught by an object and operated), the print can be canceled after the fact.

It should be noted that, in a case in which the cancellation is possible after the print execution instruction as in the present example, the cancellation before the execution instruction may not be possible. That is, only the cancellation after the execution instruction may be possible. In addition, a configuration may be adopted in which the setting can be optionally selected by the user. In a case in which only the cancellation before the print execution instruction is possible, the waiting time is not required, so the print can be performed quickly. On the other hand, in a case in which the cancellation after the print execution instruction is possible, as described above, the print instruction due to an erroneous operation can be canceled after the fact.

Print Cancellation Instruction Operation

In the embodiment described above, the configuration is adopted in which the print cancellation is instructed by the operation of the return button 25, but the operation method of making the instruction for the print cancellation is not limited to this. A configuration can also be adopted in which the print cancellation is instructed by operating other buttons. In addition, a configuration can also be adopted in which the print cancellation is instructed by operating the operation lever 40. For example, a configuration can also be adopted in which the print cancellation is instructed by the operation of slowly returning the operation lever 40 to the reference position. In this case, a unit that detects an operation amount or an operation speed of the operation lever 40 per unit time is separately provided. In addition, in a case in which the waiting time is provided, a configuration can also be adopted in which the print is canceled by operating the operation lever 40 again during the waiting time. These operations are examples of a third operation.

Image Processing

In the embodiment described above, the configuration is adopted in which, as the functions of the operation ring 13 and the operation dial 43 in the imaging mode, predetermined image processing is performed on the image to be captured in a case in which the operation ring 13 and the operation dial 43 are operated. Similarly, the captured image may be subjected to the predetermined image processing by operating the operation ring 13 and the operation dial 43. It should be noted that, in a case in which the functions of the frame advance and the frame return are assigned to the operation ring 13 and the operation dial 43, the mode is switched to the image processing mode, and the image processing function is assigned to the operation ring 13 and the operation dial 43. The switching to the image processing mode is performed, for example, by pushing the function button 27. In addition, the return to the playback mode is performed by pushing the playback button 26.

Other Embodiments

Function of Operation Lever

In the embodiment described above, the case in which the operation lever is used for the print operation has been described as an example, but the function assigned to the operation lever is not limited to this. In the following, a case in which the operation lever is assigned to the operation of another function will be described.

(1) Operation of Slideshow

As another example of the use of the operation lever 40, the operation lever 40 can be used for an operation of a slideshow.

Figure 22:
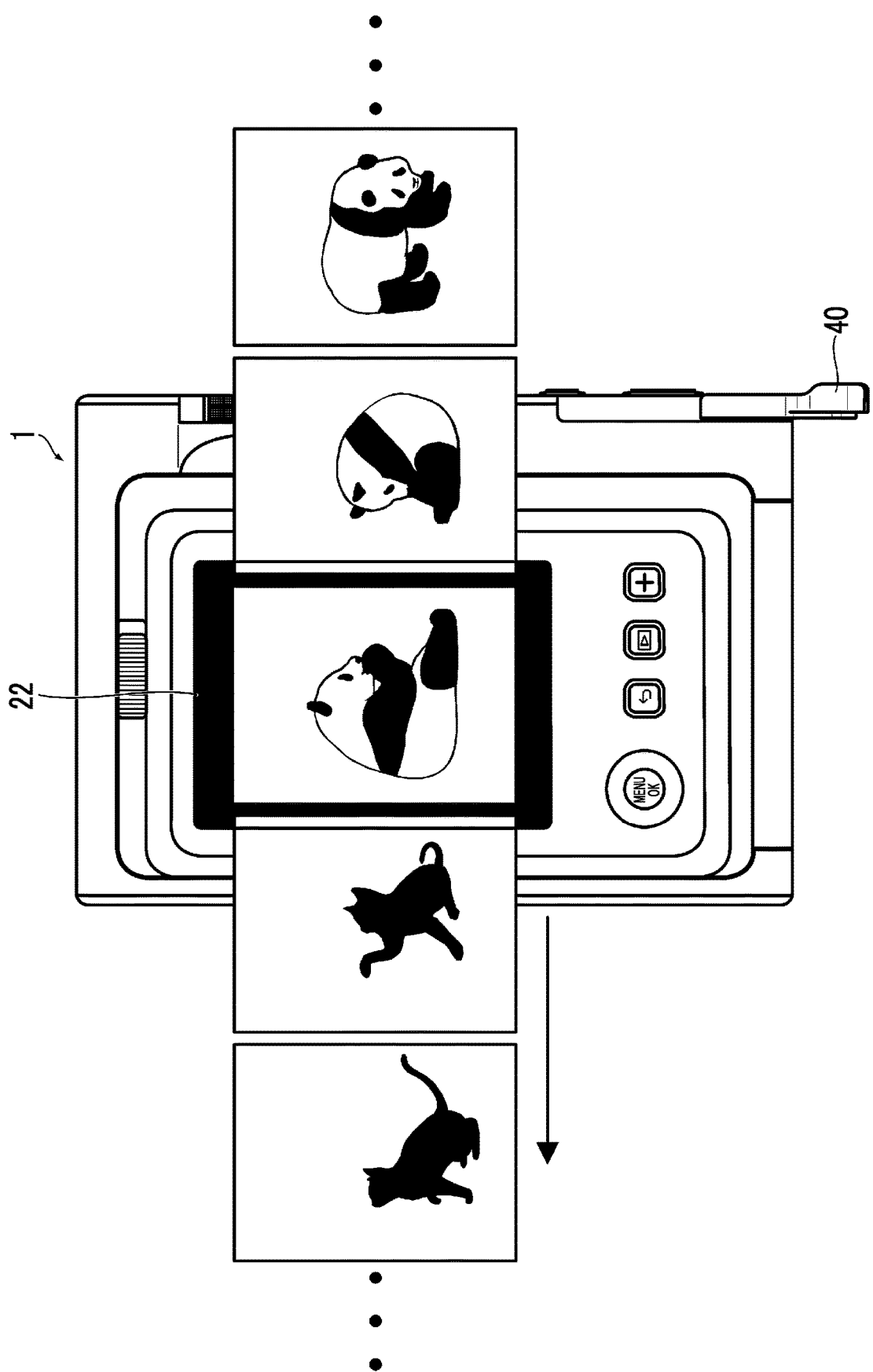
FIG. 22 is a conceptual diagram of a slideshow.

FIG. 22 is a conceptual diagram of the slideshow.

The slideshow is a form of a playback method of the captured images, and is a playback method in which a series of the captured images are sequentially switched and displayed on the display.

As shown in FIG. 22, in the present example, the images displayed side by side in a lateral row are slid in the lateral direction at a certain speed, so that the images are switched one by one.

In the playback mode, in a case in which the operation lever 40 is rotated to the command execution position, the mode proceeds to a slideshow mode and the slideshow is started.

The slideshow is continuously performed while the operation lever 40 is being operated to the command execution position. That is, the slideshow is continuously performed while the switch SW is being turned on. On the other hand, in a case in which the finger is separated from the operation lever 40 and the switch SW is turned off, the slideshow is terminated.

In this way, the operation lever 40 can also be used for the operation of the slideshow. As a result, the slideshow can be executed easily.

It should be noted that, in a case in which a unit that detects a rotation angle of the operation lever 40 is provided, the following control can be further performed. That is, it is possible to control to change a speed of the slideshow in accordance with the rotation angle of the operation lever 40. The rotation angle of the operation lever 40 is a rotation angle from the reference position. Therefore, the rotation angle is the maximum at the command execution position. The rotation angle of the operation lever 40 is detected by using a known detection unit, such as an encoder.

FIGS. 23A to 23E are diagrams showing relationships between the operation of the operation lever and the switching of the displaying of the display.

In the present example, the speed of the slideshow is increased as the rotation angle of the operation lever 40 is increased. The switching speed of the image is faster as the speed of the slideshow is faster.

FIG. 23A shows a state of the display 22 and the operation lever 40 before the slideshow is started. In this state, one frame of the captured image is displayed on the display 22.

It should be noted that the operation lever 40 is in a non-operated state (rotation angle: 0 degrees).

FIG. 23B shows the state of the display 22 and the operation lever 40 immediately after the slideshow is started. As shown in FIG. 23B, by rotating the operation lever 40 to the command execution position, the mode proceeds to the slideshow mode and the slideshow is started. In the slideshow, the playback is started from the image displayed immediately before. The playback of the image is performed in an imaging order (recording order). In the present example, in a case in which the mode proceeds to the slideshow mode, the image is displayed in a smaller size than in the normal playback mode, and a part of the previous image and a part of the next image are displayed on both the left and right sides thereof. The previous image is an image immediately before the image being played back in a playback order of the images. In the slideshow mode, a part of the previous image is displayed on the left side of the image being played back. The next image is an image immediately after the image being played back in the playback order of the images. In the slideshow mode, a part of the next image is displayed on the right side of the image being played back. In addition, in the slideshow mode, the characters "Slideshow" are displayed in the margin region on the upper side of the screen to give a notification that the slideshow mode is used.

FIG. 23C shows a state in which the images are switched. As shown in FIG. 23C, in the present example, the image is slid to the left and is switched to the next image. In addition, FIG. 23C shows a state in which the speed of the slideshow is slowed down. In this case, the operation lever 40 is returned to the reference position side, and the rotation angle is reduced.

FIG. 23D shows a state in which the speed of the slideshow is further slowed down. In this case, the operation lever 40 is returned to the reference position side, and the rotation angle is further reduced.

FIG. 23E shows a state in which the slideshow is terminated. As shown in FIG. 23E, the slideshow is terminated by returning the operation lever 40 to the reference position. In a case in which the slideshow is terminated, the mode is returned to the normal playback mode. In this case, one frame of the image displayed immediately before the termination of the slideshow is displayed on the display 22.

In this way, by changing the speed of the slideshow in accordance with the rotation angle of the operation lever 40, the operability of the slideshow can be further improved.

It should be noted that, in the example described above, as the form of the slideshow, the configuration is adopted in which the image is slid in the lateral direction and the images to be played back are switched, but the form of the slideshow is not limited to this. It is also possible to adopt a form in which the images to be displayed on the display 22 are switched one by one in order and displayed. It should be noted that the speed of the slideshow in this case is a speed at which the images are switched. The display time of each image is shorter as the switching speed of the image is faster.

(2) Operation of Image Processing

In a case in which the unit that detects the rotation angle is provided on the operation lever 40, the operation lever 40 can be used for an operation of the image processing. Specifically, the operation lever 40 can be used to adjust the intensity (degree of processing) during the image processing.

Depending on the type of the image processing, the effect given to the image may be changed by changing the intensity of the processing. Therefore, by performing the adjustment operation with the operation lever 40, good operability can be provided.

In the present example, the intensity of the image processing is adjusted by the rotation angle of the operation lever 40. Specifically, the intensity of the image processing is enhanced as the rotation angle of the operation lever 40 is larger. Therefore, the intensity is set to the maximum at the command execution position.

FIGS. 24A to 24D are diagrams showing examples of a relationship between the operation of the operation lever and the intensity of the image processing. FIGS. 24A to 24D show examples of the image processing of reducing the amount of peripheral light.

FIG. 24A shows the unprocessed state. In this state, the operation lever 40 is positioned at the reference position (rotation angle: 0 degrees).

FIGS. 24B to 24D show states in which the intensity of the image processing is enhanced. FIG. 24C shows a state in which the intensity of the image processing is enhanced as compared with that in FIG. 24B. FIG. 24D shows a state in which the intensity of the image processing is further enhanced as compared with that in FIG. 24C. It should be noted that FIG. 24D shows a case in which the intensity is set to the maximum.

As shown in FIGS. 24B to 24D, the intensity of the image processing is enhanced as the rotation angle of the operation lever 40 is increased. In addition, as shown in FIG. 24D, the intensity is the maximum at the command execution position.

After adjusting the intensity of the image processing by the operation lever 40, the adjusted intensity is decided by pushing the MENU/OK button 24.

It should be noted that a configuration can also be adopted in which the adjusted intensity can be decided by releasing the operation lever 40. That is, at a point in time at which the adjustment is completed, the adjusted intensity is decided by separating the finger from the operation lever 40.

In a case of the readjustment, the operation lever 40 is rotated again. In a case in which the operation lever 40 is operated again, the previously adjusted intensity is reset, and the intensity is adjusted again in accordance with the rotation angle.

In this way, by changing the intensity of the image processing in accordance with the rotation angle of the operation lever 40, the operability during the image processing can be further improved.

(3) Others

In addition, the operation lever 40 can be used for an operation of advancing the frame of the image in the playback mode. That is, each time the operation lever 40 is operated once (operation of rotating the operation lever 40 to the command execution position and releasing the operation lever 40), the operation lever 40 can be used for the operation of advancing one frame of the image being played back.

In addition, the operation lever 40 can be used for an operation of switching to an auto print mode in the imaging mode. The auto print mode is a mode in which the captured image is automatically printed. Therefore, in a case in which the operation lever 40 is operated once to perform the imaging, the print is executed without any print instruction.

Shape of First Operation Member

The first operation member is not limited to the shape imitating the film winding lever as in the embodiment described above, and various shapes can be adopted. For example, a dial-shape can be adopted.

Print Method

In the embodiment described above, a case in which the instant film is used as the medium and the image is printed using the exposure head has been described as an example, but the medium to be used and the print method are not limited to these. In addition, for example, thermal paper can be used as the medium, and a method printing the image using a thermal head (so-called direct thermal print method) can be adopted. This method includes a zero ink (ZINK) method and the like. In addition, a method of performing the print on the medium using an ink ribbon and the thermal head (so-called thermal transfer method), a method of performing the print on the medium using an inkjet head (inkjet method), and the like can also be adopted.

Processor

The hardware that realizes the controller, the processing unit, and the like of the digital camera with the printer can be configured by various processors. The various processors include the central processing unit (CPU) that is a general-purpose processor executing the program and functioning as the various processing units, a programmable logic device (PLD) that is a processor of which a circuit configuration can be changed after manufacture, such as a field programmable gate array (FPGA), and a dedicated electric circuit that is a processor having a circuit configuration that is designed for exclusive use in order to execute specific processing, such as an application specific integrated circuit (ASIC). One processing unit may be configured by one of the above various processors, or may be configured by two or more processors of the same type or different types. For example, one processing unit may be configured by a plurality of FPGAs or a combination of a CPU and an FPGA. In addition, a plurality of processing units may be configured by one processor. As an example of constituting the plurality of processing units with one processor, first, as represented by a computer, such as a client or a server, there is a form in which one processor is configured by a combination of one or more CPUs and the software, and the processor functions as the plurality of processing units. Second, as represented by a system on chip (SoC), there is a form in which the processor is used in which the function of the entire system including the plurality of processing units is realized by a single integrated circuit (IC) chip. As described above, the various processing units are configured by one or more of the above various processors as the hardware structure. Further, the hardware structure of these various processors is, more specifically, an electric circuit (circuitry) in which the circuit elements, such as semiconductor elements, are combined.

EXPLANATION OF REFERENCES

1: digital camera with printer
10: camera body
10a: cut-out part
11: power lever
12: lens
13: operation ring
14: first shutter button
15: strobe
16: self-timer lamp
17: selfie mirror
20: film door
20A: hinge part of film door
21: lock release lever
22: display
23: cross key
24: MENU/OK button
25: return button
26: playback button
27: function button
30: card slot cover
40: operation lever
40A: body part of operation lever
40B: lever part of operation lever
40a: abutment part of operation lever
40b1: lever body part of lever part
40b2: lever distal end part of lever part
41: second shutter button
42: reset button
43: operation dial
44: accessory shoe
50: film discharge port
60: power terminal
70: image sensor
80: film loading chamber
82: film feeding mechanism
82a: claw
84: film transport mechanism
84a: transport roller pair
84b: spreading roller pair
86: print head
90: instant film pack
92: instant film
92a: exposure surface of instant film
92b: observation surface of instant film
92c: exposure region of instant film
92d: pod part of instant film
92e: development treatment liquid pod of instant film
92f: trap part of instant film
92g: absorbing material of instant film
92h: observation region of instant film
92i: frame of observation surface of instant film
94: case
94a: opening for exposure of case
94b: discharge port of case
94c: claw opening part of case
101: imaging unit
102: print unit
103: display unit
104: storage unit
105: communication unit
106: operation unit
107: CPU
108: ROM
109: RAM
C: circle that forms lens effect GUI
CCW: operation direction of operation lever
F: feeding direction of instant film
FF: discharge direction of instant film
FR: film remaining amount display
IC: information for canceling print
IF: information on type of image processing
IL: information on type of image processing
L: straight line that forms film effect GUI
PI: image picture
SW: switch
dot1: large dot
dot2: small dot
S1 to S9: operation procedure of print in imaging mode
S11 to S19: operation procedure of print

What is claimed is:

1. A digital camera with a printer, the digital camera comprising:
an imaging unit;
a print unit that prints an image on a medium and discharges the printed medium;
a display unit;
a first operation member that is rotated from a first position in a first direction around a rotation axis against biasing force, and is rotated in a second direction opposite to the first direction by the biasing force to be returned to the first position in a case in which the first operation member is released; and
a processor, wherein:
the processor performs specific control in accordance with operation of the first operation member;
in accordance with a first operation of the first operation member, the processor performs control of generating an image picture in a case in which an image being displayed on the display unit is printed on the medium, and displaying the generated image picture on the display unit instead of the image being displayed on the display unit; and
the processor performs control of moving the image picture being displayed on the display unit along a discharge direction of the medium in a case in which print is executed.

2. The digital camera with a printer according to claim 1, wherein the processor performs control of generating an animation switched continuously or stepwise from the image being displayed on the display unit to the image picture, and displaying the generated animation on the display unit.

3. The digital camera with a printer according to claim 1, wherein the processor performs control of setting the image being displayed on the display unit as a print target image in accordance with a first operation of the first operation member, and causing the print unit to print the print target image in accordance with a second operation of the first operation member.

4. The digital camera with a printer according to claim 3, wherein the first operation is an operation of rotating the first operation member to a second position, and
the second operation is an operation of releasing the first operation member which has been rotated to the second position.

5. The digital camera with a printer according to claim 3, wherein the processor starts control of causing the print unit to print the image being displayed on the display unit after a time T has elapsed after the second operation of the first operation member.

6. The digital camera with a printer according to claim 1, further comprising:
a third operation member that is rotated; and
a fourth operation member that is rotated,
wherein the processor
performs control of switching a type of first image processing performed on an image being displayed on the display unit in accordance with an operation of the third operation member, and
performs control of switching a type of second image processing performed on the image being displayed on the display unit in accordance with an operation of the fourth operation member.

7. The digital camera with a printer according to claim 6, wherein the image being displayed on the display unit is a live view image captured by the imaging unit.

8. A digital camera with a printer, the digital camera comprising:
an imaging unit;
a print unit that prints an image on a medium and discharges the printed medium;
a display unit;
a first operation member that is rotated from a first position in a first direction around a rotation axis against biasing force, and is rotated in a second direction opposite to the first direction by the biasing force to be returned to the first position in a case in which the first operation member is released; and
a processor, wherein:
the processor performs specific control in accordance with operation of the first operation member;
the processor performs control of setting the image being displayed on the display unit as a print target image in accordance with a first operation of the first operation member, and causing the print unit to print the print target image in accordance with a second operation of the first operation member;
the processor starts control of causing the print unit to print the image being displayed on the display unit after a time T has elapsed after the second operation of the first operation member; and
the processor receives an instruction to cancel print until the time T elapses after the second operation of the first operation member.

9. The digital camera with a printer according to claim 8, wherein, in accordance with the first operation of the first operation member, the processor performs control of generating an image picture in a case in which an image being displayed on the display unit is printed on the medium, and displaying the generated image picture on the display unit instead of the image being displayed on the display unit.

10. The digital camera with a printer according to claim 9,
wherein the processor performs control of generating an animation switched continuously or stepwise from the image being displayed on the display unit to the image picture, and displaying the generated animation on the display unit.

11. The digital camera with a printer according to claim 8, wherein the first operation is an operation of rotating the first operation member to a second position, and
the second operation is an operation of releasing the first operation member which has been rotated to the second position.

12. The digital camera with a printer according to claim 8, further comprising:
a second operation member that is pressed,
wherein the processor receives the instruction to cancel the print in accordance with an operation of the second operation member.

13. The digital camera with a printer according to claim 8,
wherein the processor receives the instruction to cancel the print in accordance with a third operation of the first operation member.

14. The digital camera with a printer according to claim 8, further comprising:
a third operation member that is rotated; and
a fourth operation member that is rotated,
wherein the processor
performs control of switching a type of first image processing performed on an image being displayed on the display unit in accordance with an operation of the third operation member, and performs control of switching a type of second image processing performed on the image being displayed on the display unit in accordance with an operation of the fourth operation member.

15. The digital camera with a printer according to claim 14, wherein the image being displayed on the display unit is a live view image captured by the imaging unit.

16. A method of controlling a digital camera with a printer, the digital camera comprising:

an imaging unit; a print unit that prints an image on a medium and discharges the printed medium; a display unit; and a first operation member that is rotated from a first position in a first direction around a rotation axis against biasing force, and is rotated in a second direction opposite to the first direction by the biasing force to be returned to the first position in a case in which the first operation member is released, the method comprising:

performing, in accordance with a first operation of the first operation member, control of generating an image picture in a case in which an image being displayed on the display unit is printed on the medium, and displaying the generated image picture on the display unit instead of the image being displayed on the display unit; and performing control of moving the image picture being displayed on the display unit along a discharge direction of the medium in a case in which print is executed.

17. A method of controlling a digital camera with a printer, the digital camera comprising:

an imaging unit; a print unit that prints an image on a medium and discharges the printed medium; a display unit; and a first operation member that is rotated from a first position in a first direction around a rotation axis against biasing force, and is rotated in a second direction opposite to the first direction by the biasing force to be returned to the first position in a case in which the first operation member is released, the method comprising:

performing control of setting the image being displayed on the display unit as a print target image in accordance with a first operation of the first operation member, and causing the print unit to print the print target image in accordance with a second operation of the first operation member;

starting control of causing the print unit to print the image being displayed on the display unit after a time T has elapsed after the second operation of the first operation member; and receiving an instruction to cancel print until the time T elapses after the second operation of the first operation member.

* * * * *